United States Patent
Tsuchiya et al.

(10) Patent No.: US 8,873,103 B2
(45) Date of Patent: Oct. 28, 2014

(54) IMAGE PROCESSING APPARATUS AND METHOD FOR SUPPRESSING UNEVEN GLOSSINESS USING CLEAR INKS

(71) Applicant: Canon Kabushiki Kaisha, Tokyo (JP)

(72) Inventors: Okinori Tsuchiya, Kawasaki (JP); Tohru Ikeda, Yokohama (JP); Akihiko Nakatani, Kawasaki (JP); Yugo Mochizuki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/869,502

(22) Filed: Apr. 24, 2013

(65) Prior Publication Data

US 2013/0300785 A1 Nov. 14, 2013

(30) Foreign Application Priority Data

May 8, 2012 (JP) ................................. 2012-106990

(51) Int. Cl.
- *G06F 15/00* (2006.01)
- *B41J 11/00* (2006.01)
- *B41J 2/21* (2006.01)
- *G06K 15/10* (2006.01)
- *C09D 11/40* (2014.01)
- *B41J 2/175* (2006.01)
- *B41M 5/00* (2006.01)
- *B41M 7/00* (2006.01)

(52) U.S. Cl.
CPC ............... *B41J 2/17566* (2013.01); *B41M 5/00* (2013.01); *B41M 7/0036* (2013.01); *B41J 11/0015* (2013.01); *B41J 2/21* (2013.01); *G06K 15/107* (2013.01); *C09D 11/40* (2013.01); *B41M 5/0011* (2013.01); *B41J 2/2114* (2013.01)

USPC ........... 358/1.9; 358/3.23; 358/521; 358/534; 347/15; 347/14; 347/212; 347/100; 347/101

(58) Field of Classification Search
None
See application file for complete search history.

(56) References Cited

U.S. PATENT DOCUMENTS

| | | | |
|---|---|---|---|
| 6,341,833 B1 * | 1/2002 | Liu et al. | 347/15 |
| 7,196,714 B2 * | 3/2007 | Someno | 347/212 |
| 7,216,967 B2 * | 5/2007 | Matsuzawa et al. | 347/101 |
| 7,692,791 B2 * | 4/2010 | Nishiuma et al. | 356/364 |
| 8,027,058 B2 * | 9/2011 | Jinno | 358/1.9 |
| 8,485,629 B2 | 7/2013 | Iritani et al. | |
| 2011/0242176 A1 * | 10/2011 | Iritani et al. | 347/15 |

(Continued)

FOREIGN PATENT DOCUMENTS

| | | |
|---|---|---|
| JP | 3591534 B2 | 11/2004 |
| JP | 2011-218564 A | 11/2011 |

*Primary Examiner* — Paul F Payer
(74) *Attorney, Agent, or Firm* — Fitzpatrick, Cella, Harper & Scinto

(57) ABSTRACT

Uneven glossiness is effectively suppressed between areas where light inks are mainly used and areas where dark inks are mainly used. The gloss is raised in areas where dark cyan ink C is used. In other words, the application amount of second clear ink applied by after application printing is set to 32% at primary cyan (grid point 16) to equalize the gloss with areas where light cyan ink LC is used. Also, the application amount of first clear ink applied by common printing is set to 32% in a highlight portion (grid point 8) to equalize the gloss with the maximum gloss reached using dark cyan ink C. In so doing, it is possible to keep the gloss nearly constant over the entire range from white to cyan, or in other words, suppress uneven glossiness.

17 Claims, 20 Drawing Sheets

(56) References Cited

U.S. PATENT DOCUMENTS

| | | |
|---|---|---|
| 2011/0285780 A1 | 11/2011 | Yamada et al. |
| 2012/0081436 A1 | 4/2012 | Yamada et al. |
| 2012/0081439 A1 | 4/2012 | Goto et al. |
| 2012/0081449 A1 | 4/2012 | Kagawa et al. |

* cited by examiner

NO CL

COMMON PRINTING USING CL (CL1)

AFTER APPLICATION PRINTING USING CL (CL2)

COMMON PRINTING USING CL (CL1)

AFTER APPLICATION PRINTING USING CL (CL2)

IMAGE PROCESSING APPARATUS AND METHOD FOR SUPPRESSING UNEVEN GLOSSINESS USING CLEAR INKS

BACKGROUND OF THE INVENTION

1. Field of the Invention

The present invention relates to an image processing apparatus, an inkjet printing apparatus, and an image processing method, and more particularly, to technology that suppresses uneven glossiness in a printed image using clear inks, which substantially do not contain color material.

2. Description of the Related Art

The technology described in Japanese Patent No. 3591534 is known as a technology that suppresses uneven glossiness. Japanese Patent No. 3591534 describes adjusting the glossiness of a printed image by setting an application amount of clear ink which substantially does not contain color material, on the basis of application amounts of colored inks which do contain color material. According to this technology, when forming an image on a print medium with high glossiness, the clear ink is mainly printed in areas with low amounts of the colored ink, thus making it possible to reduce uneven glossiness.

In addition, Japanese Patent Laid-Open No. 2011-218564 describes a clear ink printing method that executes two printing modes: a first printing mode for common printing that applies clear ink to the same area before completing the application of colored ink; and a second printing mode for after application printing that applies the clear ink to an area after completing the application of the colored ink in that same area. In addition, by switching between these two printing modes, it is possible to realize either an emphasis on uniform glossiness or an emphasis on a dark color gamut.

However, in the case of printing a mixed image containing areas where light inks are mainly used as well as areas where dark inks are mainly used, there is a problem of being unable to effectively suppress uneven glossiness when clear ink is used in the same way across these areas. Furthermore, this problem is difficult to solve even when using the technology described in any of the above literatures.

More specifically, Japanese Patent No. 3591534 merely describes a method of adjusting glossiness according to the amount of colored ink. For this reason, glossiness is simply adjusted with the clear ink according to the respective amounts of colored ink both in areas where light inks are mainly used and in areas where dark inks are mainly used, whereas the relative glossiness among these areas cannot be adjusted. Particularly, it is not possible to solve the problem of the glossiness becoming too strong in the areas where light inks are mainly used.

Meanwhile, Japanese Patent Laid-Open No. 2011-218564 describes differentiating the way of using the clear ink according to the two printing modes, but the way of using the clear ink is determined according to whether or not uniform glossiness is to be emphasized. For this reason, even if the way of using clear ink is differentiated, it is not possible to adjust glossiness between the areas where the light inks are mainly used and the areas where the dark inks are mainly used.

SUMMARY OF THE INVENTION

An object of the present invention is to provide an image processing apparatus, an inkjet printing apparatus, and an image processing method enabling the effective suppression of uneven glossiness between areas where light inks are mainly used and areas where dark inks are mainly used.

In a first aspect of the present invention, there is provided an image processing apparatus for forming an image on a unit area of a print medium by performing printing by applying a colored first ink, a colored second ink with a lower color material concentration than that of the first ink and having the same hue as that of the first ink, and clear ink to the print medium with use of a print head, the apparatus comprising: a determining unit configured to determine application amounts for each of the first and second inks, a first application amount of the clear ink which is an application amount of the clear ink for the printing operation that starts applying the clear ink to the unit area before completing applying the colored ink to the unit area, and a second application amount of the clear ink which is an application amount of the clear ink for the printing operation that starts applying the clear ink to the unit area after completing applying the colored ink to the unit area, based on image data of the image; and a controlling unit configured to cause the print head to eject the first ink, the second ink, and the clear ink to the print medium according to the application amounts for the first ink, the second ink and the clear ink determined by the determining unit, wherein the determining unit determines the application amounts for the first ink, the second ink and the clear ink such that in at least a part of cases that satisfy a condition that the application amount for the second ink is greater than the application amount for the first ink, the first application amount is greater than the second application amount, and in at least apart of cases that satisfy a condition that the application amount for the first ink is greater than the application amount for the second ink, the second application amount is greater than the first application amount.

In a second aspect of the present invention, there is provided an image processing method of forming an image on a unit area of a print medium by performing printing by applying a colored first ink, a colored second ink with a lower color material concentration than that of the first ink and having the same hue as that of the first ink, and clear ink to the print medium with use of a print head, the method comprising: a determining step of determining application amounts for each of the first and second inks, a first application amount of the clear ink which is an application amount of the clear ink for the printing operation that starts applying the clear ink to the unit area before completing applying the colored ink to the unit area, and a second application amount of the clear ink which is an application amount of the clear ink for the printing operation that starts applying the clear ink to the unit area after completing applying the colored ink to the unit area, based on image data of the image; and a controlling step of causing the print head to eject the first ink, the second ink, and the clear ink to the print medium according to the application amounts for the first ink, the second ink and the clear ink determined by the determining step, wherein the determining step determines the application amounts for the first ink, the second ink and the clear ink such that in at least a part of cases that satisfy a condition that the application amount for the second ink is greater than the application amount for the first ink, the first application amount is greater than the second application amount, and in at least a part of cases that satisfy a condition that the application amount for the first ink is greater than the application amount for the second ink, the second application amount is greater than the first application amount.

According to the above configuration, it is possible to effectively suppress uneven glossiness between areas where light inks are mainly used and areas where dark inks are mainly used.

Further features of the present invention will become apparent from the following description of exemplary embodiments (with reference to the attached drawings).

DESCRIPTION OF THE EMBODIMENTS

Hereinafter, embodiments of the present invention will be described in detail and with reference to the drawings.

According to an embodiment of the present invention, an inkjet printing apparatus prints onto a glossy print medium using multiple colors of colored ink (coloring ink) containing pigment material, and clear ink which substantially does not contain color material. In addition, both the application amounts of clear ink and colored ink as well as the printing method are controlled during printing to control the glossiness of the printed material. Before describing the embodiment of the present invention, gloss and image clarity will be described below.

Figure 1A:
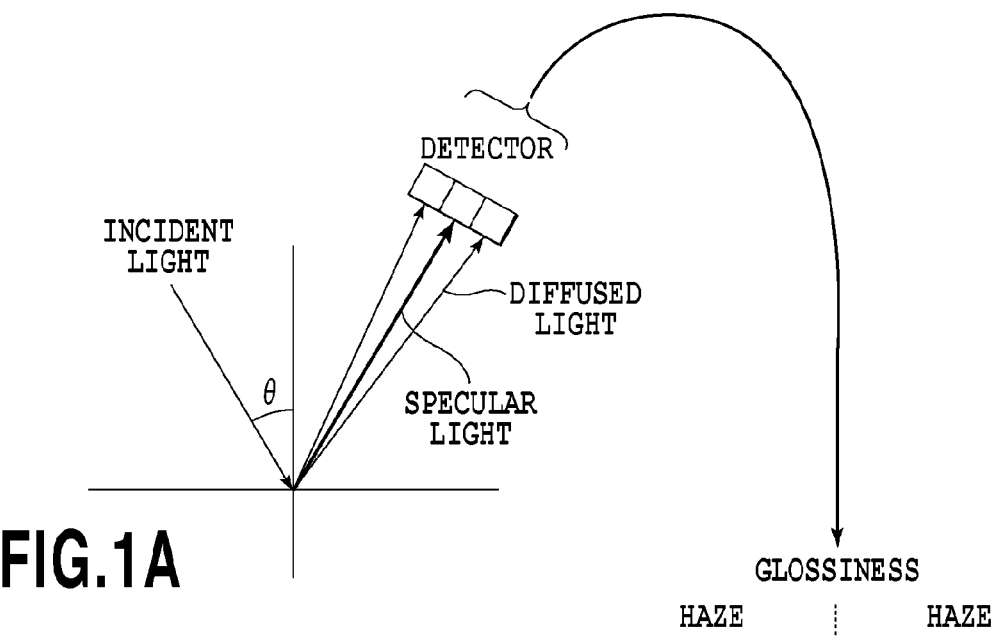
FIGS. 1A to 1D are diagrams illustrating gloss and haze.

Gloss feeling typically may be divided into glossiness and haze. Hereinafter, gloss and haze will be explained using FIGS. 1A to 1D. As illustrated in FIG. 1A, values for the 20° mirror plane gloss (hereinafter designated gloss) and haze may be computed by detecting the reflected light reflected off a printed material surface with a detector (for example, the B-4632 from BYK-Gardner, Japanese product name Micro-Haze Plus). The reflected light is distributed over some angle centered about the axis of its specular light. As illustrated in FIG. 1D, the gloss may be detected through an aperture width of 1.8° at the detector center, for example, while the haze is detected over a range of ±2.7° farther outward, for example. In other words, when observing reflected light, the gloss is defined to be the reflection ratio of specular light constituting the central axis of the distribution versus the incident light. Meanwhile, the haze or haze value is defined to be the measurement of diffuse light produced near the specular light in the distribution of the reflected light. Note that the gloss and the haze measured by the above detector have dimensionless units, with the gloss conforming to JIS K5600 and the haze conforming to ISO/DIS 13803.

Image clarity may be measured using JIS H8686 (Test Methods for Image Clarity of Anodic Oxide Coatings on Aluminum and Aluminum Alloys) or JIS K7105 (Testing Methods for Optical Properties of Plastics), for example, and expresses the sharpness of an image appearing on a print medium. For example, the image clarity value decreases in the case where an illuminated image appearing on a print medium is blurry. The Image Clarity Meter ICM-1T (Suga Test Instruments) and the Image Clarity Measuring Device GP-1S (Optec) are commercially available devices for measuring image clarity that conform to JIS standards.

Figure 1B:
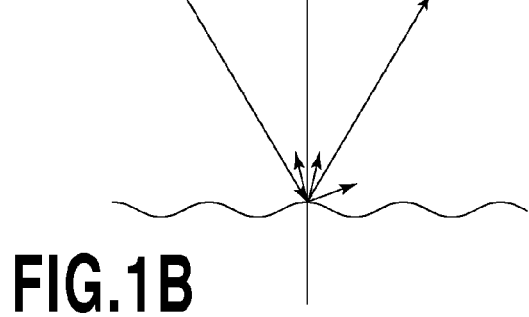
Figure 1C:
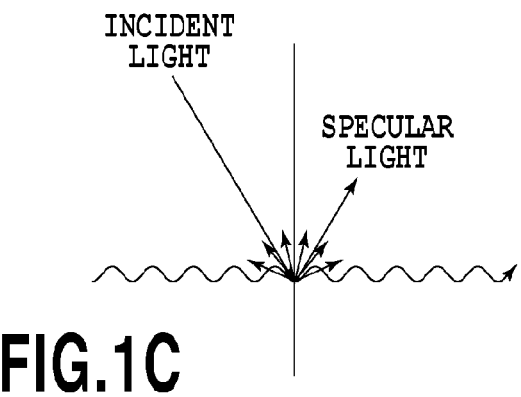
Figure 1D:
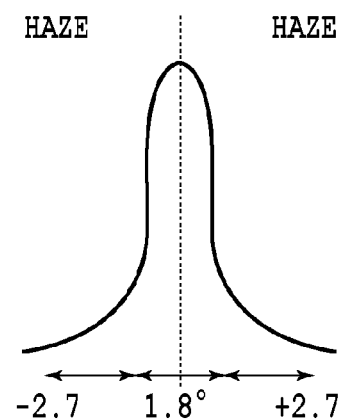

FIGS. 1B and 1C are diagrams illustrating how the magnitude and direction of reflected light change depending on the surface roughness of the printed image. As FIGS. 1B and 1C demonstrate, typically the reflected light scatters and the amount of specular light decreases as the surface becomes rougher, and thus smaller values are measured for image clarity and glossiness.

(Relationship Between Printing Method Versus Glossiness and Tint)

Next, the relationship between the printing method for colored ink and clear ink used in an embodiment of the present invention versus the glossiness and tint in an image printed thereby will be described.

Figure 2A:
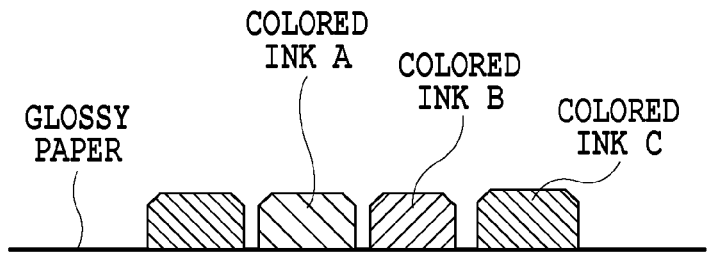
FIGS. 2A to 2C are schematic diagrams illustrating the states of colored ink and clear ink landings.
Figure 2B:
Figure 2C:
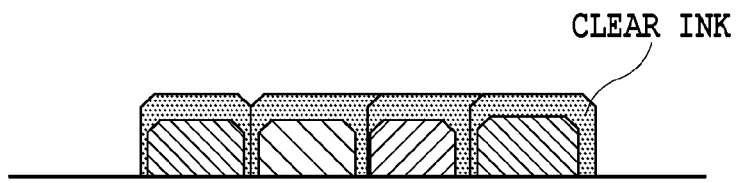

FIGS. 2A to 2C are schematic diagrams illustrating the states of colored ink and clear ink landings. FIG. 2A illustrates the case of not applying the clear ink, while FIGS. 2B and 2C respectively illustrate two types of methods for applying the clear ink discussed later, namely, common printing and after application printing, respectively.

As illustrated in FIG. 2B, a printing method that starts printing clear ink before completing printing with colored ink is designated "common printing" in this specification. In the present embodiment, the common printing prints the clear ink during the same scan as the colored ink, as discussed later with drawings such as FIG. 8. It is possible to print with this method by treating the clear ink data for the print as CL1 data discussed later. Typically, ink droplets containing many color materials and polymers that easily remain on the sheet surface tend to inhibit the permeation of droplets applied later. Moreover, the sheet is wetted differently depending on the type of paper and differences in surface tension among ink droplets. In this way, since ejected droplets wet the sheet differently upon landing and have different permeation speeds, depending on the droplet type and the surface state of the print medium to which the ink droplets are ejected, fixed dots have varying heights, and smoothness decreases, as shown in FIG. 2B. As a result, image clarity and glossiness tend to decrease, and this tendency becomes greater with more types of colored inks in use and also with greater quantities of such colored ink and clear ink.

Meanwhile, as illustrated in FIG. 2C, a printing method that starts printing clear ink after completing printing with colored ink is designated "after application printing". In the present embodiment, the after application printing prints clear ink during a later scan after completing the scans for printing the colored ink, as discussed later with drawings such as FIG. 9. It is possible to print with this method by treating the clear ink data for the print as CL2 data discussed later. The after application printing not only maintains the surface smoothness of the printed image, but rather improves smoothness in some cases, as shown in FIG. 2C. For this reason, image clarity is less likely to decrease, and there is a tendency for only the glossiness to change greatly according to the amount of clear ink. In other words, if clear ink is applied to an area with low glossiness, the glossiness increases according to the amount of the clear ink, whereas the glossiness decreases if clear ink is applied to an area of high glossiness.

Note that it is possible to raise the glossiness of a low-gloss print medium by applying a fixed amount of clear ink to blank areas, regardless of the printing method (either common printing or after application printing).

(Apparatus Configuration)

Figure 3:
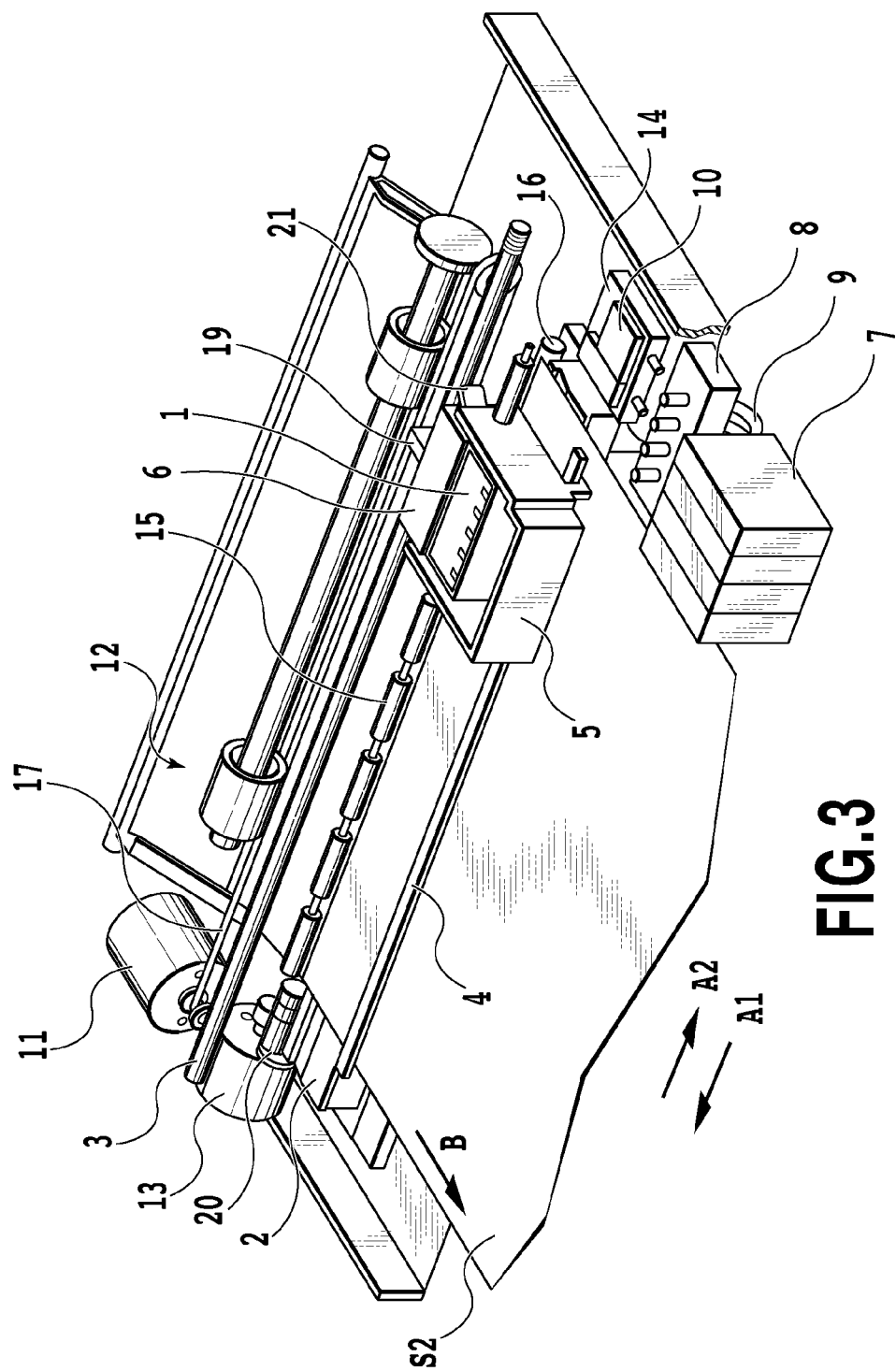
FIG. 3 is a perspective view illustrating a configuration of an inkjet printing apparatus according to an embodiment of the present invention.

FIG. 3 is a perspective view illustrating a configuration of an inkjet printing apparatus according to an embodiment of the present invention. After inserting a print medium via a feed tray 12, the printing apparatus of the present embodiment prints an image or the like while intermittently conveying the print medium in the direction indicated by the arrow B, and discharges the print medium into a discharge tray.

The print head 1 mounted on the carriage 5 is able to print an image onto a print medium S2 by ejecting ink from nozzles provided on the print head while moving along a guide rail 4 in the direction of the arrows A1 and A2. The print head 1 includes, for example, multiple nozzle groups corresponding to respectively different colors of ink. For example, there may be nozzle groups for ejecting a total of 10 colors: the colored inks cyan (C), magenta (M), yellow (Y), light cyan (LC), light magenta (LM), red (R), photo black (PBk), gray (Gy), and matte black (MBk), and clear ink (CL; ink that substantially does not contain color material). Inks for these respective colors, including clear ink, are stored in ink tanks (not illustrated), and supplied to the print head 1 from these ink tanks. Also, the ejection volume of the print head 1 is approximately the same for each color, at 4 pl (pico-liter). Additionally, in the present embodiment, the ink tanks and the print head 1 are integrated to constitute a head cartridge 6, with the head cartridge 6 mounted onto the carriage 5. It should be noted that though cyan ink is also called "dark" cyan ink in this specification, the word "dark" only means that the cyan ink has higher coloring material concentration than that of light cyan ink. That is, dark ink does not necessarily means to have high coloring material concentration.

By transferring driving force from a carriage motor 11 to the carriage 5 with a timing belt 17, the carriage 5 is made to move back and forth along a guide axle 3 and the guide rail 4 in the direction of the arrows A1 and A2 (the main scan direction). During this carriage movement, the position of the carriage 5 is detected by an encoder sensor 21 provided on the carriage 5 reading a linear scale 19 provided along the carriage movement direction. In addition, a print medium is printed on by ejecting ink from the nozzles of the print head at timings corresponding to the detected signal. For every scan of the print head, the print medium S2 supplied by the feed tray 12 is conveyed by a given amount. In other words, the print medium S2 is held between a conveyance roller 16 and a pinch roller 15, and in addition, is conveyed by a given amount in the direction of the arrow B (the sub-scan direction) due to the conveyance roller 16 being driven by the driving force from a conveyance motor 13 via a linear wheel 20. A head cap 10 and a recovery unit 14 are provided at a home position provided at an edge of the print head's movement range, and a recovery process for the print head 1 is intermittently conducted as necessary.

When the printing for a single sheet of print medium finishes by repeating the operations described above, the print medium is discharged, thus completing the printing of a single sheet. At this time, in a printing mode that uses the clear ink CL, printing is conducted with bidirectional scans indicated by the arrows A1 and A2, for example, in accordance with the arrangement of nozzle arrays for the 10 colors of ink in the print head, as discussed later with drawings such as FIG. 12. Also, with the multi-pass printing discussed later with drawings such as FIG. 6, the clear ink CL is ejected afterwards onto the areas printed with colored inks. By controlling the respective amounts of the clear ink CL ejected before and after printing with these colored inks, it becomes possible to reduce bronzing.

(Ink Composition)

The respective components constituting the pigment inks used by the inkjet printing apparatus of the present embodiment will now be described.

(Aqueous Medium)

An aqueous medium containing water and a water-soluble organic solvent is preferably used for the inks used in the present invention. The content of water-soluble organic solvent in each of the inks (mass percentage) is preferably between 3.0% w/w and 50.0% w/w inclusive with respect to the total mass of the ink. Additionally, the content of water in each of the inks (mass percentage) is preferably between 50.0% w/w and 95.0% w/w inclusive with respect to the total mass of the ink.

Specifically, potential examples of substances usable as the water-soluble organic solvent include: C1-C6 alkyl alcohols such as methanol, ethanol, propanol, propanediol, butanol, butanediol, pentanol, pentanediol, hexanol, and hexanediol; amides such as dimethylformamide and dimethylacetamide;

ketones or ketoalcohols such as acetone and diacetone alcohol; ethers such as tetrahydrofuran and dioxane; polyalkylene glycols such as polyethylene glycol, polypropylene glycol and others with mean molecular weights of 200, 300, 400, 600, and 1000; alkylene glycols having a C2-C6 alkylene base, such as ethylene glycol, propylene glycol, butylene glycol, triethylene glycol, 1,2,6-hexanetriol, thiodiglycol, hexylene glycol, and diethylene glycol; lower alkyl ether acetates such as polyethylene glycol monomethyl ether acetate; glycerine; lower alkyl ethers of polyalcohols, such as ethylene glycol monomethyl (or ethyl)ether, diethylene glycol methyl (or ethyl) ether, or triethylene glycol monomethyl (or ethyl)ether; and N-methyl-2-pyrrolidone, 2-pyrrolidone, and 1,3-dimethyl-2-imidazolidinone. Also, deionized water (ion-exchanged water) is preferably used as the water.

(Pigment)

Carbon black and organic pigments are preferably used as the pigments. The content of pigment in each of the inks (mass percentage) is preferably between 0.1% w/w and 15.0% w/w inclusive with respect to the total mass of the ink.

For the black ink, carbon black such as furnace black, lampblack, acetylene black, or channel black is preferably used. Specifically, potential examples of commercially available products which may be used include: Raven 7000, 5750, 5250, 5000 Ultra, 3500, 2000, 1500, 1250, 1200, 1190 Ultra II, 1170, and 1255 (Columbian); Black Pearls L, Regal 300R, 400R, and 660R, Mogul L, Monarch 700, 800, 880, 900, 1000, 1100, 1300, 1400, and 2000, and Vulcan XC-72R (Cabot); Color Black FW1, FW2, FW2V, FW18, FW200, 5150, 5160, and 5170, Printex 35, U, V, 140U, and 140V, Special Black 6, 5, 4A, and 4 (Degussa); and No. 25, No. 33, No. 40, No. 47, No. 52, No. 900, No. 2300, MCF-88, MA600, MA7, MA8, and MA100 (Mitsubishi Chemical). Carbon black newly prepared for the present invention may also be used. Obviously, the present invention is not limited to the above, and any carbon black of the related art may be used. Furthermore, the present invention is not limited to any carbon black, and substances such as magnetite or ferrite magnetic nanoparticles, and titanium black may also be used as pigment.

Specific examples of organic pigments include: water-insoluble azo pigments such as Toluidine Red, Toluidine Maroon, Hansa Yellow, Benzidine Yellow, and Pyrazolone Red; water-soluble azo pigments such as Lithol Red, Helio Bordeaux, Pigment Scarlet, and Permanent Red 2B; vat dye derivatives such as Alizarin, Indanthrone, and Thioindigo Maroon; phthalocyanine-based pigments such as Phthalocyanine Blue and Phthalocyanine Green; quinacridone-based pigments such as Quinacridone Red and Quinacridone Magenta; perylene-based pigments such as Perylene Red and Perylene Scarlet; isoindolinone-based pigments such as Isoindolinone Yellow and Isoindolinone Orange; imidazolone-based pigments such as Benzimidazolone Yellow, Benzimidazolone Orange, and Benzimidazolone Red; pyranthrone-based pigments such as Pyranthrone Red and Pyranthrone Orange; indigo-based pigments, condensed azo pigments, thioindigo-based pigments, and diketo-pyrrolopyrrole-based pigments; and Flavanthrone Yellow, Acylamido Yellow, Quinoline Yellow, Nickel Azo Yellow, Copper Azomethine Yellow, Perinone Orange, Anthrone Orange, Dianthraquinonyl Red, and Dioxazine Violet. Obviously, the present invention is not limited to the above.

Furthermore, when expressing organic pigments by color index (C.I.) numbers, examples of usable pigments include: C.I. Pigment Yellow 12, 13, 14, 17, 20, 24, 74, 83, 86, 93, 97, 109, 110, 117, 120, 125, 128, 137, 138, 147, 148, 150, 151, 153, 154, 166, 168, 180, and 185; C.I. Pigment Orange 16, 36, 43, 51, 55, 59, 61, and 71; C.I. Pigment Red 9, 48, 49, 52, 53, 57, 97, 122, 123, 149, 168, 175, 176, 177, 180, 192, 215, 216, 217, 220, 223, 224, 226, 227, 228, 238, 240, 254, 255, and 272; C.I. Pigment Violet 19, 23, 29, 30, 37, 40, and 50; C.I. Pigment Blue 15, 15:1, 15:3, 15:4, 15:6, 22, 60, and 64; C.I. Pigment Green 7 and 36; and C.I. Pigment Brown 23, 25, and 26. Obviously, the present invention is not limited to the above.

(Dispersant)

Any water-soluble plastic may be used as a dispersant to disperse pigments such as the above in the aqueous medium. More particularly, the dispersant preferably has a weight-average molecular weight between 1,000 and 30,000 inclusive, and more preferably between 3,000 and 15,000 inclusive. The content of dispersant in each of the inks (mass percentage) is preferably between 0.1% w/w and 5.0% w/w inclusive with respect to the total mass of the ink.

Specifically, potential examples of substances usable as the dispersant include: styrene, vinylnaphthalene, aliphatic alcohol esters of ethylene/$\alpha,\beta$-unsaturated carboxylic acid, acrylic acid, maleic acid, itaconic acid, fumaric acid, vinyl acetate, vinyl pyrolidone, acrylamide, and polymers taking derivatives thereof as monomers. Note that one or more of the monomers constituting a polymer is preferably a hydrophilic monomer, and a block copolymer, random copolymer, graft copolymer, or any of their salts may be used. Alternatively, a natural resin such as rosin, shellac, or starch may also be used. Such resins are preferably soluble in an aqueous solution with a dissolved base, or in other words, are alkali-soluble.

(Surfactant)

In order to adjust the surface tension of the inks constituting the ink set, it is preferable to use a surfactant such as an anionic surfactant, a non-ionic surfactant, or an amphoteric surfactant. Specifically, substances such as polyoxyethylene alkyl ether, polyoxyethylene alkyl phenols, acetylenic glycol compounds, and acetylenic glycol ethylene oxide adducts may be used.

(Other Components)

Besides the above components, the inks constituting the ink set may also contain moisture-retaining solids such as urea, urea derivatives, trimethylolpropane, and trimethylolethane in order to stay moist. The content of moisture-retaining solids in each of the ink (mass percentage) is preferably between 0.1% w/w and 20.0% w/w inclusive, and more preferably between 3.0% w/w and 10.0% w/w inclusive with respect to the total mass of the ink. In addition, the inks constituting the ink set may also contain various additives other than the above components as necessary, such as pH adjusters, anticorrosive agents, preservatives, mold inhibitors, antioxidants, anti-reduction agents, and evaporation accelerators.

Next, the inks used in the present embodiment will be specifically described. The present invention is not limited by the following embodiment insofar as the principle matter thereof is not exceeded. Note that the terms "parts" and "%" herein are based on mass, unless specifically noted otherwise.

(Preparation of Resin Solution A)

A random copolymer with an acid value of 288 mg KOH/g, a weight-average molecular weight of 10,000, and a monomer composition of styrene/n-butyl acrylate/acrylic acid=23/37/37 was neutralized to 1 equivalent with potassium hydroxide. After that, the solution was adjusted with water to reach a resin concentration of 10.0% and obtain a resin solution A.

(Preparation of Resin Solution B)

A resin solution B was prepared similarly to the preparation of the resin solution A, except that a random copolymer with an acid value of 288 mg KOH/g, a weight-average molecular weight of 10,000, and a monomer composition of styrene/n-butyl acrylate/acrylic acid=23/37/37 was used instead of the styrene/acrylic acid random copolymer with an acid value of 200 mg KOH/g, a weight-average molecular weight of 10,000 that was used in the resin solution A.
(Preparation of Pigment Dispersions 1 to 4)
Pigment dispersions 1 to 4 were prepared according to the procedure indicated below.
<Preparation of Pigment Dispersion 1 Containing C.I. Pigment Red 122>
10 parts pigment (C.I. Pigment Red 122) were mixed with 20 parts resin solution A and 70 parts ion-exchanged water, and dispersed for three hours using a batch-type vertical sand mill. After that, coarse particulate was removed by a centrifugation process. Additionally, the mixture was filtered under pressure through a cellulose acetate filter (Advantec) with a pore size of 3.0 μm to obtain the pigment dispersion 1 with a pigment concentration of 10% w/w.
<Preparation of Pigment Dispersion 2 Containing C.I. Pigment Blue 15:3>
10 parts pigment (C.I. Pigment Blue 15:3) were mixed with 20 parts resin solution A and 70 parts ion-exchanged water, and dispersed for five hours using a batch-type vertical sand mill. After that, coarse particulate was removed by a centrifugation process. Additionally, the mixture was filtered under pressure through a cellulose acetate filter (Advantec) with a pore size of 3.0 μm to obtain the pigment dispersion 2 with a pigment concentration of 10% w/w.
<Preparation of Pigment Dispersion 3 Containing C.I. Pigment Yellow 74>
10 parts pigment (C.I. Pigment Yellow 74) were mixed with 20 parts resin solution A and 70 parts ion-exchanged water, and dispersed for one hour using a batch-type vertical sand mill. After that, coarse particulate was removed by a centrifugation process. Additionally, the mixture was filtered under pressure through a cellulose acetate filter (Advantec) with a pore size of 3.0 μm to obtain the pigment dispersion 3 with a pigment concentration of 10% w/w.
<Preparation of Pigment Dispersion 4 Containing C.I. Pigment Black 7>
10 parts carbon black pigment (C.I. Pigment Black 7) were mixed with 20 parts resin solution A and 70 parts ion-exchanged water, and dispersed for three hours using a batch-type vertical sand mill. Note that the circumferential velocity during the dispersion was twice that during the preparation of the pigment dispersion 1. After that, coarse particulate was removed by a centrifugation process. Additionally, the mixture was filtered under pressure through a cellulose acetate filter (Advantec) with a pore size of 3.0 μm to obtain the pigment dispersion 4 with a pigment concentration of 10% w/w.

(Preparation of Ink)
After mixing and sufficiently stirring the respective components indicated in Table 1, the mixtures were filtered under pressure through a cellulose acetate filter (Advantec) with a pore size of 0.8 μm to prepare the colored inks 1 to 7 and clear ink.
However, the composition of the clear ink CL is not limited to the above. The clear ink CL may contain a different type of resin or a different amount of added resin insofar as the result is an ink that covers pigment color material remaining on a sheet surface in order to prevent bronzing, and achieves similar effects.

TABLE 1

|  |  | Ink | | | | | | | |
| --- | --- | --- | --- | --- | --- | --- | --- | --- | --- |
|  |  | 1 | 2 | 3 | 4 | 5 | 6 | 7 | 8 |
| Pigment dispersion | 1 | 40 | 10 |  |  |  |  |  |  |
|  | 2 |  |  | 40 | 10 |  |  |  |  |
|  | 3 |  |  |  |  | 40 |  |  |  |
|  | 4 |  |  |  |  |  | 30 | 10 |  |
| Resin solution B | 5 |  |  |  |  |  |  |  | 1 |
| Glycerin |  | 5.0 | 5.0 | 5.0 | 5.0 | 5.0 | 5.0 | 5.0 | 5.0 |
| Diethylene glycol |  | 5.0 | 5.0 | 5.0 | 5.0 | 5.0 | 5.0 | 5.0 | 5.0 |
| Polyethylene glycol 1000 |  | 5.0 | 5.0 | 5.0 | 5.0 | 5.0 | 5.0 | 5.0 | 5.0 |
| Surfynol 465 |  | 1.0 | 1.0 | 1.0 | 1.0 | 1.0 | 1.0 | 1.0 | 1.0 |
| Ion-exchanged water |  | 44 | 74 | 44 | 74 | 44 | 54 | 74 | 83 |
| Ink type |  | M | Lm | C | Lc | Y | K | Gy | CL |

Figure 4:
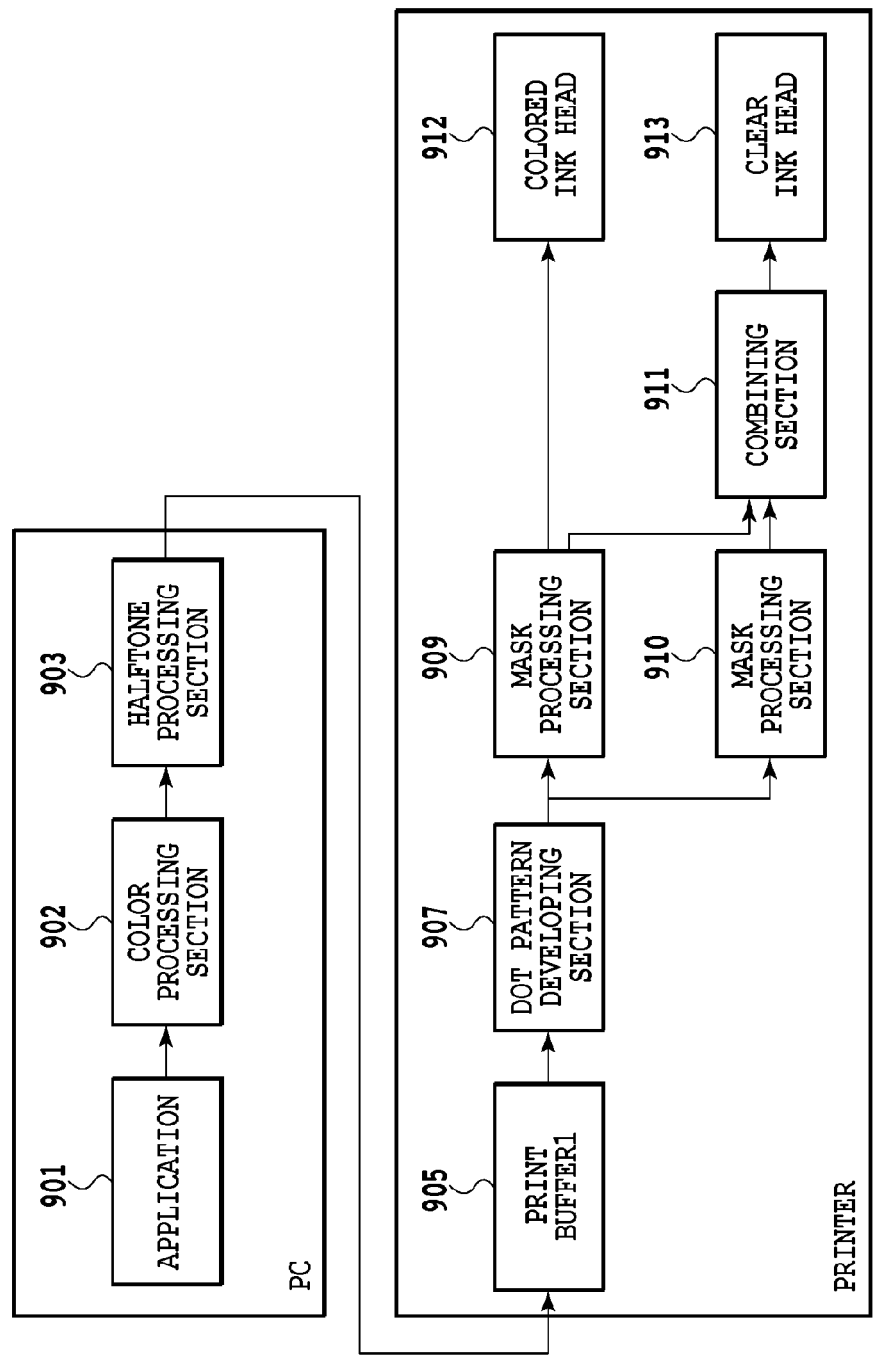
FIG. 4 is a block diagram illustrating an image processing configuration in a printing system made up of an inkjet printing apparatus according to an embodiment of the present invention and a personal computer (PC) that acts as the host device thereof.

(First Embodiment)
FIG. 4 is a block diagram illustrating an image processing configuration in a printing system made up of an inkjet printing apparatus according to an embodiment of the present invention and a personal computer (PC) that acts as the host device thereof. Note that image processing executed by the printing system illustrated in FIG. 4 is realized by control and processing elements in the PC and printer, respectively. Note also that application of the present invention is obviously not limited to this embodiment. For example, the image processing components up to the combining section illustrated in FIG. 4 may be incorporated into the PC, or alternatively, the image processing configuration of the color processing section and thereafter may be incorporated into the printer. In this specification, these image processing components and image processing configurations are also referred as an image processing apparatus.
Image data processed by an application 901 on the PC is input into a color processing section 902 also on the PC as RGB image data with 8 bits per color, for a total of 24 bits. The color processing section 902 uses color conversion tables discussed later with FIG. 15 to convert the RGB image data into image data (ink use amount data) made up of signals for the colors C, M, Y, Lc, Lm, R, PBk, Gy, and MBk of the colored inks used by the inkjet printing apparatus, as well as a first signal CL1 and a second signal CL2 for clear ink. The output signal has 12 bits per color, for a total of a 132-bit signal. With this signal, gradation can be maintained. As discussed later with FIGS. 10 and 11, the clear ink signal CL1 constitutes image data (first use amount data) for ejecting the clear ink onto the same area during the same scan as colored ink. On the other hand, the signal CL2 constitutes image data (second use amount data) for ejecting the clear ink onto the same area as the above, but during a separate scan after printing with the colored ink.

The halftone processing section 903 performs a halftoning process such as error diffusion to convert a multi-level input signal with 12 bits per color, or 4096 values, into N-valued data that is less than 4096 values. Specifically, the N value is multi-level, with 2 to 4 bits per color, for approximately 3 to 16 values. Note that although the present embodiment illustrates an example of halftoning that yields multi-level data, the configuration is not limited thereto, and halftoning that yields binary data is also acceptable.

Figure 5:
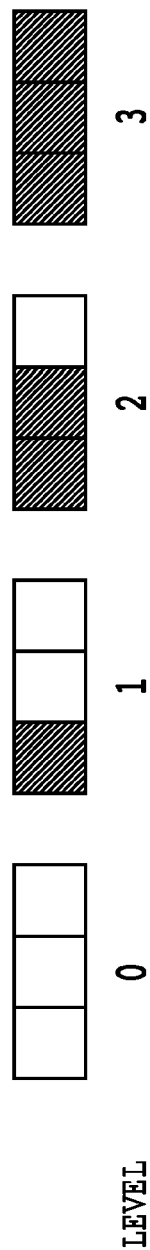
FIG. 5 is a diagram illustrating dot layout patterns according to an embodiment of the present invention.

The halftone-processed, N-valued image data from the PC is forwarded to the inkjet printing apparatus (printer) and stored in a print buffer 905. A dot pattern developing section 907 retrieves the N-valued data stored in the print buffer 905, and develops dot patterns according to the N values. FIG. 5 is a diagram illustrating dot patterns. The example depicted in FIG. 5 illustrates dot patterns for the N=4 case, in which dot patterns of 3 pixels×1 pixel are determined in correspondence with each of the levels 0, 1, 2, and 3 expressed by the 4-valued image data. Each pattern represents binary data, in which pixels shaded by black indicate dots which are ON, while white pixels indicate dots which are OFF. In other words, the dot pattern development yields binary data at triple the resolution in the scan direction. Respective dot patterns corresponding to each signal value (pixel value) are similarly developed for the clear ink image data CL1 and CL2, yielding binary data for each.

Next, the mask processing sections 909 and 910 split the binary data for each ink obtained by the dot pattern developing section 907 into data corresponding to multiple scans by the print head over the same printing area. This process is conducted using thinning patterns (hereinafter also referred to as mask patterns). The mask processing section 909 performs mask processes to the data for the colored inks C, M, Y, Lc, Lm, R, PBk, MBk, and Gy as well as the clear ink data CL1, while the mask processing section 910 performs mask processes to the clear ink data CL2, thus generating respective print data.

Figure 6:
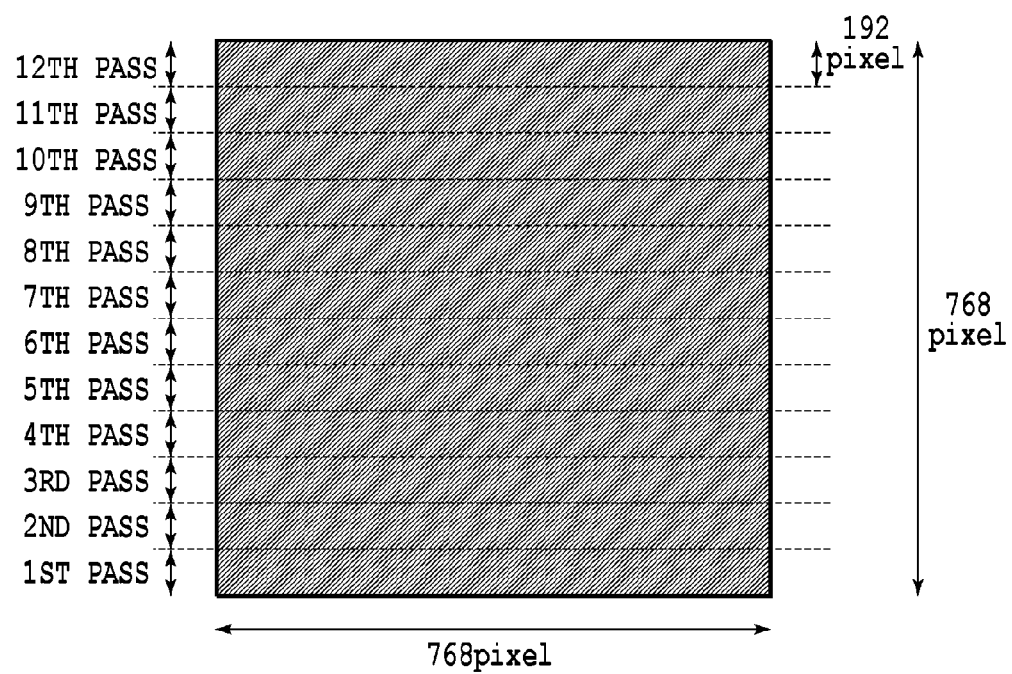
FIG. 6 is a diagram illustrating a typical mask pattern for comparison with a mask pattern of the present embodiment.
Figure 7:
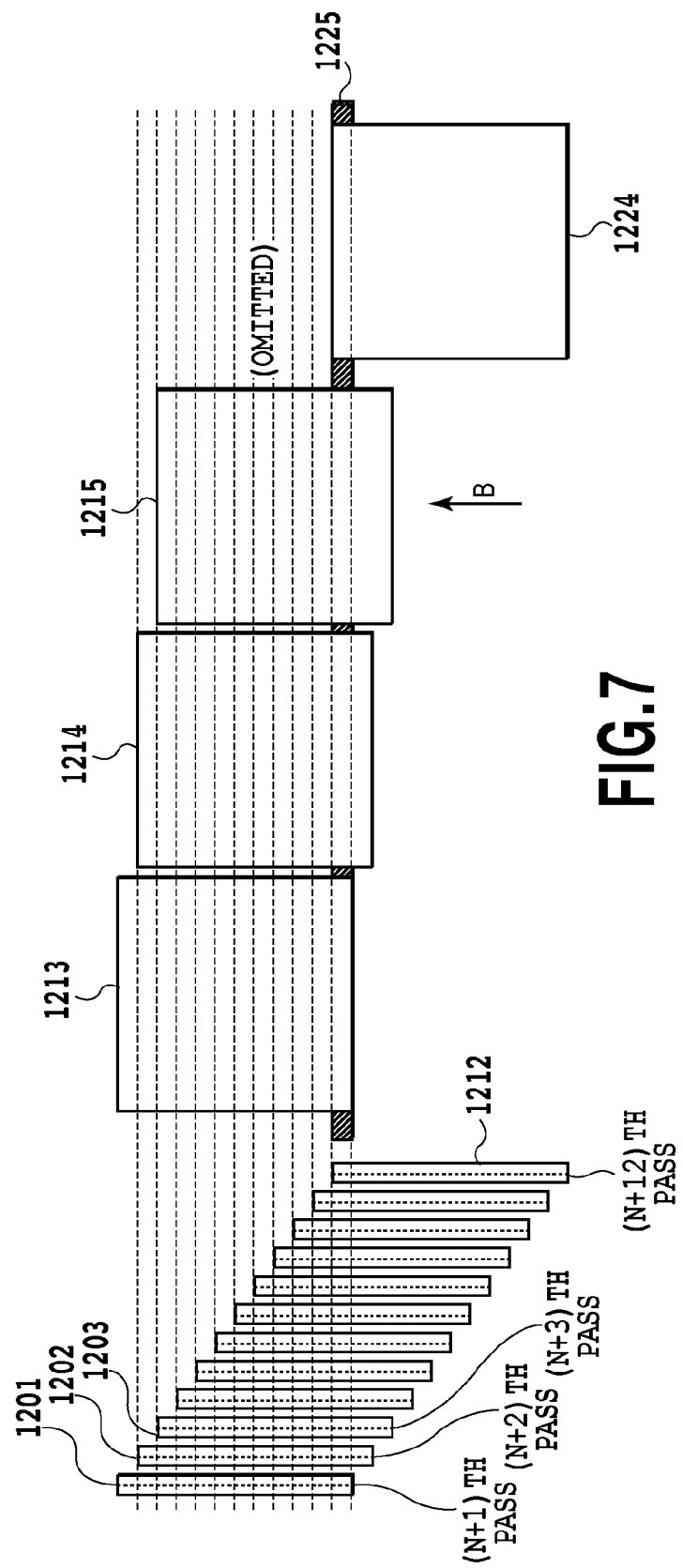
FIG. 7 is a diagram illustrating multi-pass printing using the mask pattern illustrated in FIG. 6.

FIG. 6 is a diagram illustrating a typical mask pattern for comparison with a mask pattern of the present embodiment. The mask pattern illustrated in FIG. 6 is a mask pattern for 12-pass multi-pass printing, which completes the printing of the same unit area in 12 scans. In this mask pattern, pixels turned ON in a particular pass are represented with black dots while pixels turned OFF are represented with white dots, with the dot layout being determined randomly (such a layout is depicted using gray or hatching in FIG. 6 and subsequent drawings). The vertical-by-horizontal pixel size is 768 pixels by 768 pixels, with the vertical direction corresponding to a nozzle array direction in the print head, and the horizontal direction corresponding to the main scan direction in which the print head scans. Also, the vertical pixel size of 768 corresponds to the 768 nozzles in the print head. As illustrated by broken lines in FIG. 6, dividing the vertical 768 pixels into 12 sections yield divided mask areas (1st pass to 12th pass) having a vertical height of 64 pixels, which correspond to the unit areas whose printing is completed in the above 12 scans. Each of these unit areas are successively printed by varying the nozzles used, on the basis of print data masked by the mask patterns for 1st pass to 12th pass. Furthermore, these mask patterns for 1st pass to 12th pass are mutually complementary. The mask patterns for 1st pass to 12th pass in this example have nearly the same duty, or in other words, a duty of approximately 8.3%. FIG. 7 is a diagram illustrating multi-pass printing using the mask pattern illustrated in FIG. 6. In FIG. 7, reference numerals 1201 to 1212 indicate the relative positions of the print head (in FIG. 7, the print head is illustrated for only one color for simplicity) to the printing sheet, and reference numeral 1213 to 1225 indicate a single mask pattern associated with a nozzle array in the print head. Note that these mask patterns, although given different reference numerals, represent the same single mask pattern, and illustrate how the position of the corresponding mask pattern also moves together with the above relative movement of the print head. In other words, FIG. 7 illustrates how the divided mask areas of a mask pattern and divided nozzle groups are associated with the unit area 1225, whose printing on the printing sheet is completed as the printing sheet is successively conveyed while conducting 12-pass multi-pass printing. Note that whereas FIG. 7 illustrates the print head and the mask pattern as moving relative to the printing sheet, in actuality the position of the printing sheet moves as the printing sheet is conveyed.

As illustrated in FIG. 7, a scan by the print head (position) 1201 is conducted during the scan of (N+1)-th pass. At this point, the unit area 1225 is printed on the basis of print data generated by the lowermost mask area of the mask pattern 1213, using the lowermost nozzle group from among the nozzle groups obtained by dividing the nozzles on the nozzle array into 12 sections. Next, the printing sheet is conveyed a distance equivalent to the width of the above unit area in the direction of the arrow B in FIG. 7. Then, a scan by the print head (position) 1202 is conducted during the scan of the next (N+2)-th pass, and the unit area 1225 is printed on the basis of print data generated by the second from lowermost mask area of the mask pattern 1214, using the second from lowermost nozzle group from among the nozzle groups. At this point, a separate unit area neighboring the unit area 1225 is also printed on the basis of print data generated by the lowermost neighboring mask area, using the lowermost neighboring nozzle group. Similarly, the printing sheet is conveyed and the print head scans, until a scan by the print head (position) 1212 is conducted during the scan of the (N+12)-th pass, and the unit area 1225 is printed on the basis of print data generated by the twelfth from the lowermost mask area of the mask pattern 1224, using the twelfth from the lowermost (or in other words the uppermost) nozzle group from among the nozzle groups. At this point, the printing of the unit area 1225 is completed.

Figure 8:
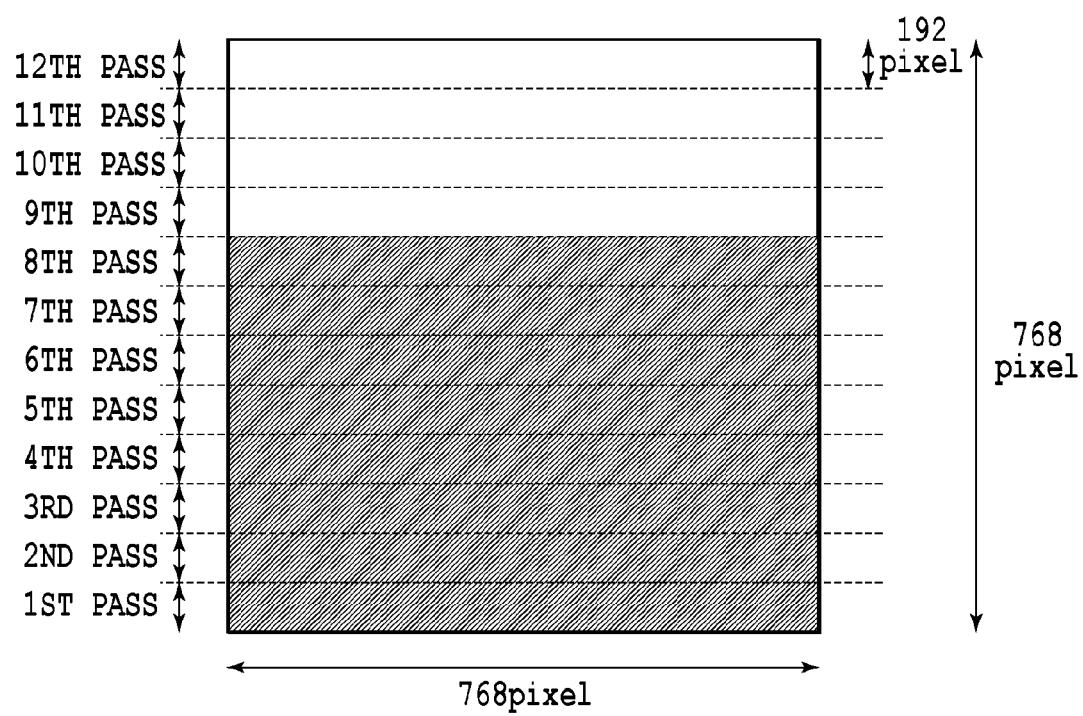
FIG. 8 is a diagram illustrating a mask pattern according to the present embodiment used by a mask processing section 909.

FIG. 8 is a diagram illustrating a mask pattern according to the present embodiment used by the mask processing section 909, which performs mask processes to the colored ink data and the clear ink data CL1. Unlike the typical mask pattern illustrated in FIG. 6, the black ON dots (and the white OFF dots) exist only in the divided mask areas corresponding to 1st pass to 8th pass, with no ON dots in the divided mask areas corresponding to 9th pass to 12th pass. That is, when using this mask, the printing of a unit area is completed in the eight passes from 1st to $8^{th}$ pass.

Figure 9:
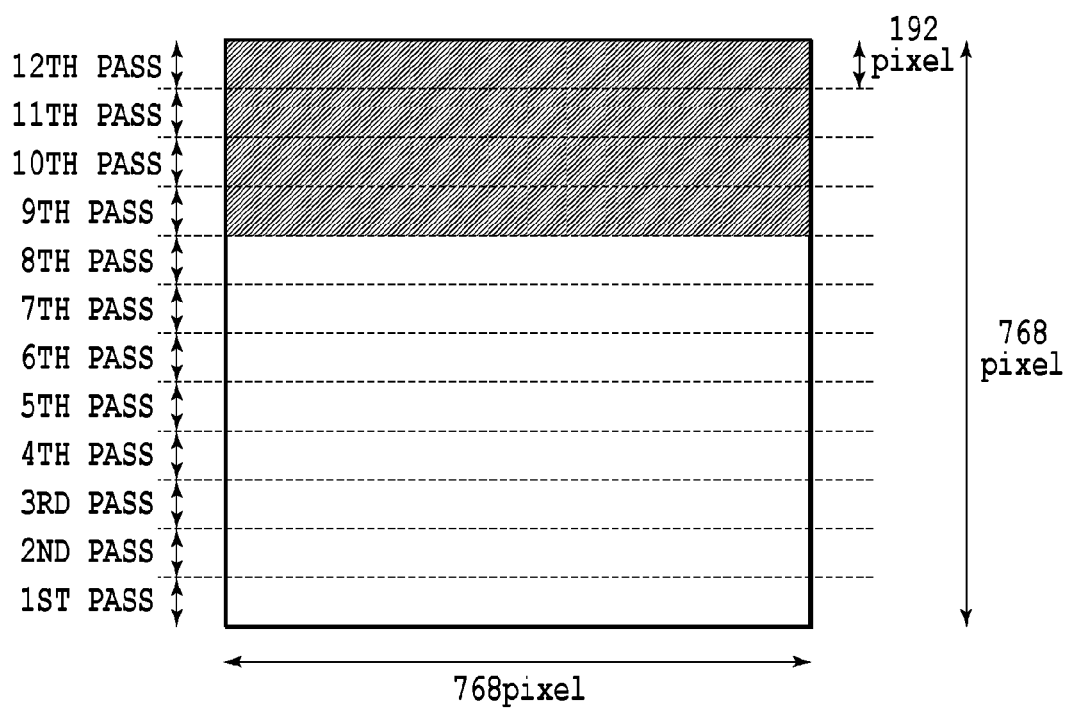
FIG. 9 is a diagram illustrating a mask pattern according to the present embodiment used by a mask processing section 910.

On the other hand, FIG. 9 is a diagram illustrating a mask pattern according to the present embodiment used by the mask processing section 910, which performs mask processes to the clear ink data CL2. As illustrated in FIG. 9, unlike the mask pattern used for the colored ink and the clear ink data CL1 illustrated in FIG. 8, ON dots exist only in the divided mask areas corresponding to 9th pass to 12th pass, with no ON dots in the divided mask areas corresponding to 1st pass to 8th pass.

Figure 12:
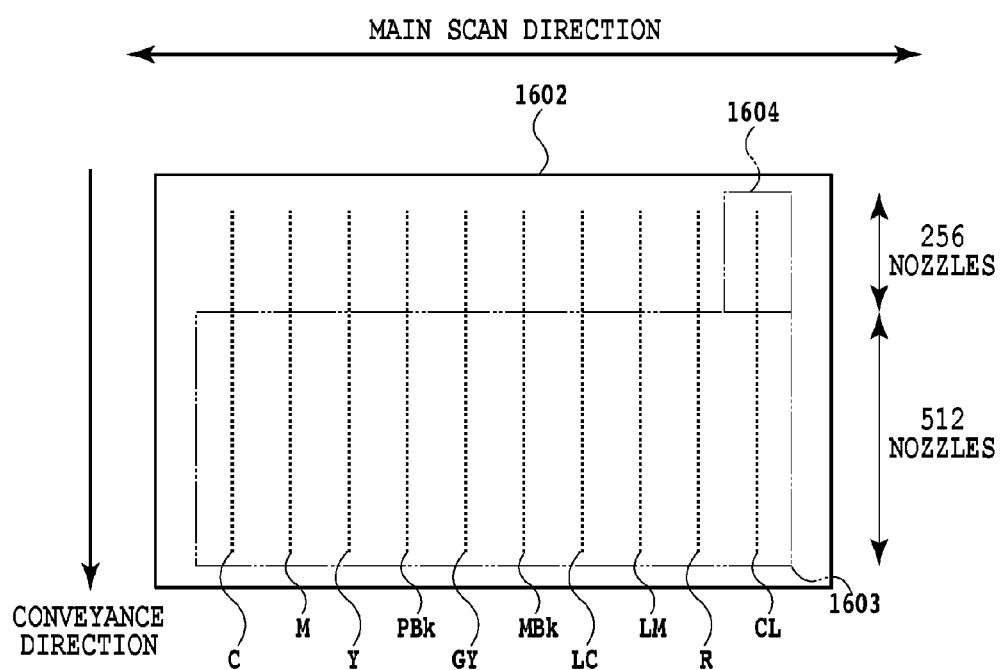
FIG. 12 is a diagram primarily illustrating nozzle lines that respectively eject nine colors of ink and clear ink in a print head according to an embodiment of the present invention.
Figure 13:
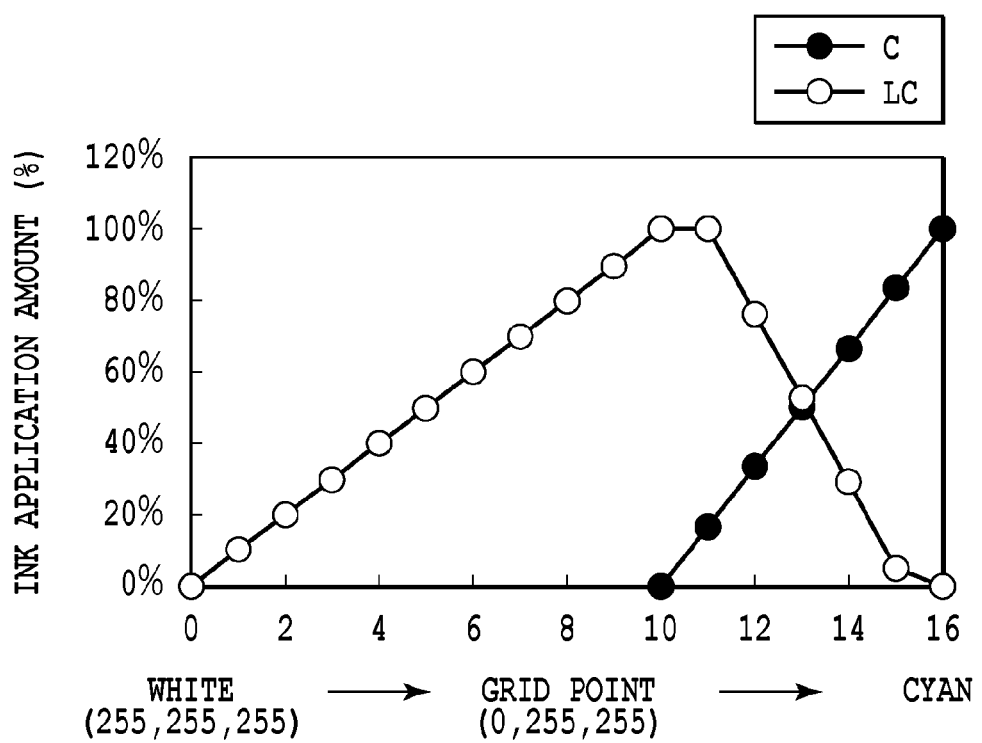
FIG. 13 is a diagram illustrating ink application amounts for dark and light cyan ink on a white-to-cyan line that proceeds from a white point to primary cyan according to the present embodiment.

FIGS. 12 and 13 are diagrams respectively illustrating how the mask pattern illustrated in FIG. 8, which is used by the mask processing section 909, and the mask pattern illustrated in FIG. 9, which is used by the mask processing section 910, are used in multi-pass printing. These drawings are similar to FIG. 7.

Figure 10:
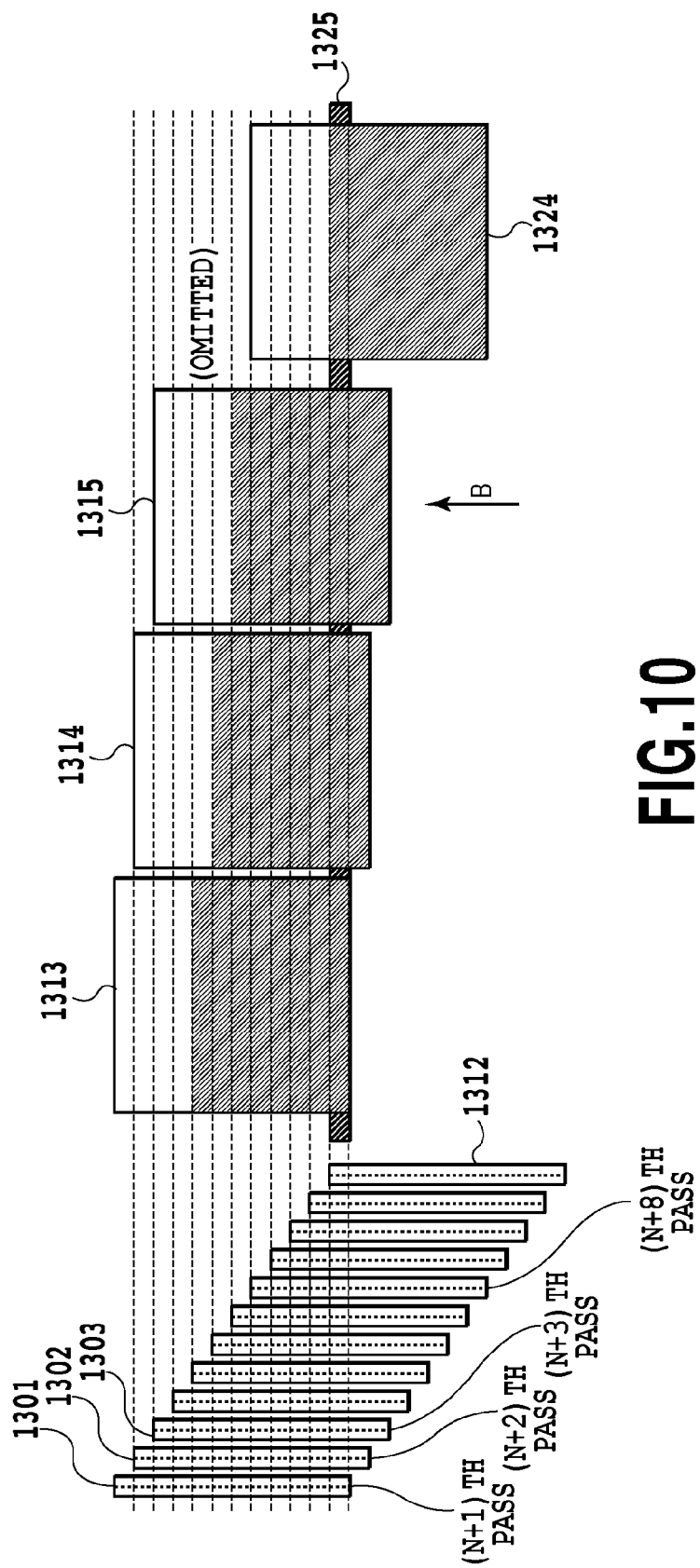
FIG. 10 is a diagram illustrating how the mask pattern illustrated in FIG. 8 is used by the mask processing section 909 in multi-pass printing.
Figure 11:
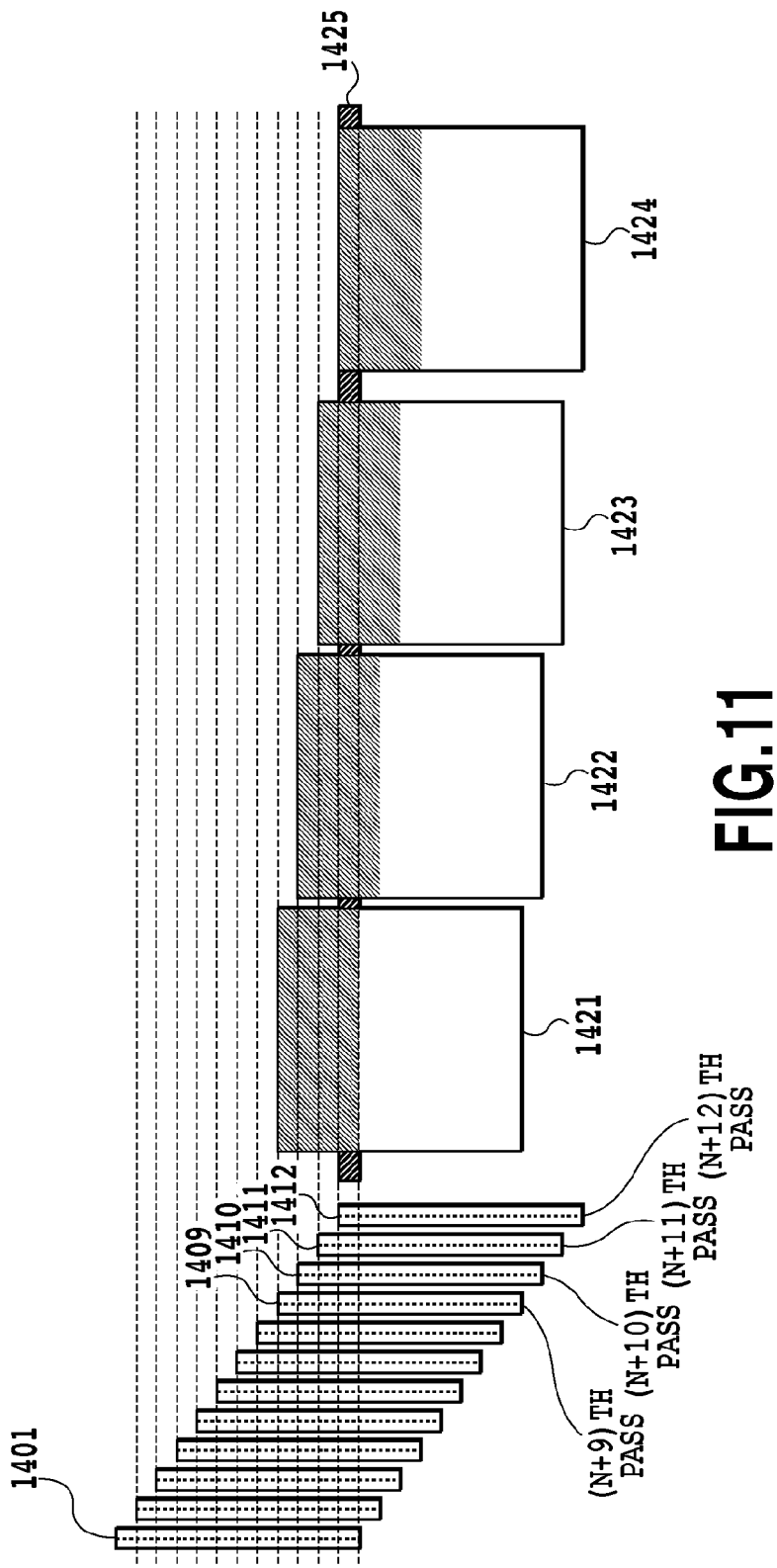
FIG. 11 is a diagram illustrating how the mask pattern illustrated in FIG. 9 is used by the mask processing section 910 in multi-pass printing.

Reference numerals 1301 to 1312 in FIG. 10 and reference numerals 1401 to 1412 in FIG. 11 indicate the print head (the print head is illustrated for only one color, similarly to FIG. 7). Also, reference numerals 1313 to 1324 in FIG. 10 and reference 1421 to 1424 in FIG. 11 indicate a single mask pattern associated with a nozzle array in the print head, similarly to FIG. 7.

As illustrated in FIG. 10, the divided mask areas (1st pass to 8th pass) illustrated in FIG. 8 are used during the scans of (N+1)-th pass to (N+8)-th pass to print the unit area 1325 on the basis of print data generated thereby. When this 8-pass printing finishes, next, as illustrated in FIG. 11, the divided mask areas (9th pass to 12th pass) illustrated in FIG. 9 are used during the scans of (N+9)-th pass to (N+12)-th pass to print the unit area 1425 (the same area as the area 1325) on the basis of print data generated thereby.

As a result, 8-pass printing based on the clear ink data CL1 and the colored ink data is first conducted on the unit area (1325, 1425). After the 8-pass printing based on the clear ink data CL1 and the colored ink data, 4-pass printing is conducted on the basis of the clear ink data CL2 in separate passes.

Referring again to FIG. 4, after generating the binary data for the clear ink and the colored ink using the respective mask patterns of the mask processing sections 909 and 910 as described above, the combining section 911 combines the clear ink data CL1 and CL2. Since the 12 divided mask areas have mutually exclusive arrangements of ON dots in a mask pattern obtained by combining the mask patterns illustrated in FIGS. 10 and 11, the combining process takes the logical sum of the respective data. The clear ink data combined by the combining section 911 is sent to the clear ink print head (nozzle array) 913, and the print head is driven and clear ink is ejected on the basis thereof. In addition, Each data for the colored inks which has been subjected to the mask process by the mask processing section 909 is transferred to the colored ink head (nozzle array) 912 and the print head is driven based on the transferred data to eject the colored ink.

FIG. 12 is a diagram primarily illustrating nozzle arrays that respectively eject the nine color inks and one clear ink in the print head according to the present embodiment. As illustrated in FIG. 12, on the print head 1602, the nozzle usage range 1603 is the lower 512 nozzles corresponding to the mask pattern illustrated in FIG. 8, while the nozzle usage range 1604 corresponding to the mask pattern illustrated in FIG. 9 is the upper 256 nozzles for clear ink. With this configuration, since a print medium is conveyed in the direction of the arrow B illustrated in FIG. 12, printing by the nozzle usage range 1603 is conducted during the earlier scans, while printing by the nozzle usage range 1604 is conducted during the later scans. In this way, the applications of the clear inks based on the clear ink data CL1 and CL2 are performed so that nozzles in a nozzle group at downstream side eject the clear ink according to the clear ink data CL1 and nozzles in a nozzle group at upstream side eject the clear ink according to the clear ink data CL2.

Also, since printing is conducted with scans in both directions during printing operations, printing is conducted with scans proceeding from left to right as well as with scans proceeding from right to left as viewed in FIG. 12. For this reason, in these respective scans, the clear ink is ejected onto the same area before and after the colored ink, respectively.

Note that the user is able to select multiple printing modes in the application 901 (FIG. 4). In the present embodiment, a color mode and a monochrome photo mode are selectable.

Furthermore, the color processing section 902 (FIG. 4) sets the amount of each ink to use with respect to the RGB values of input image data depending on which printing mode has been selected and set. At this point, respective use amounts are also set for the data CL1 for clear ink applied to the print medium during the same scan as colored ink, and for the data CL2 for clear ink applied to the print medium during a separate scan after printing with the colored ink.

FIG. 13 is a diagram illustrating ink usage amounts (application amounts) for dark and light cyan ink on a white-to-cyan line in which the image data RGB values proceed from a white point at (255, 255, 255) to primary cyan (the color of cyan at maximum saturation) at (0, 255, 255) according to the present embodiment. In other words, FIG. 13 illustrates the content of a color separation table (in practice, the table also includes clear ink usage amounts, as discussed later with FIG. 17) which is used by the color processing section 902 (FIG. 4). More specifically, FIG. 13 illustrates ink usage amounts for printing the colors at respective grid points. In FIG. 13, the horizontal axis represents the number of a grid point in the color separation table corresponding to RGB values, while the vertical axis represents the ink application amount (rate). Note that in the present embodiment, 100% is defined to be the amount of ink equivalent to applying eight dots of 4 pL ink droplets on one unit section of a 600 dpi grid on a print medium.

As illustrated in FIG. 13, in the highlight portion from grid point 0 to grid point 10, only the light ink LC is used, with the usage amount monotonically increasing over this range. This enables suppression of graininess in the printed image. Starting at grid point 11, the dark ink C begins to be used, and monotonically increases over the range from grid point 11 to primary cyan at grid point 16. Thus, insufficient density reproduction with only the light ink LC is supplemented by dark ink. By substituting in the dark ink C over this range, the light ink LC monotonically decreases from grid point 11 to grid point 16, becoming 0 at the primary cyan at grid point 16.

Figure 14:
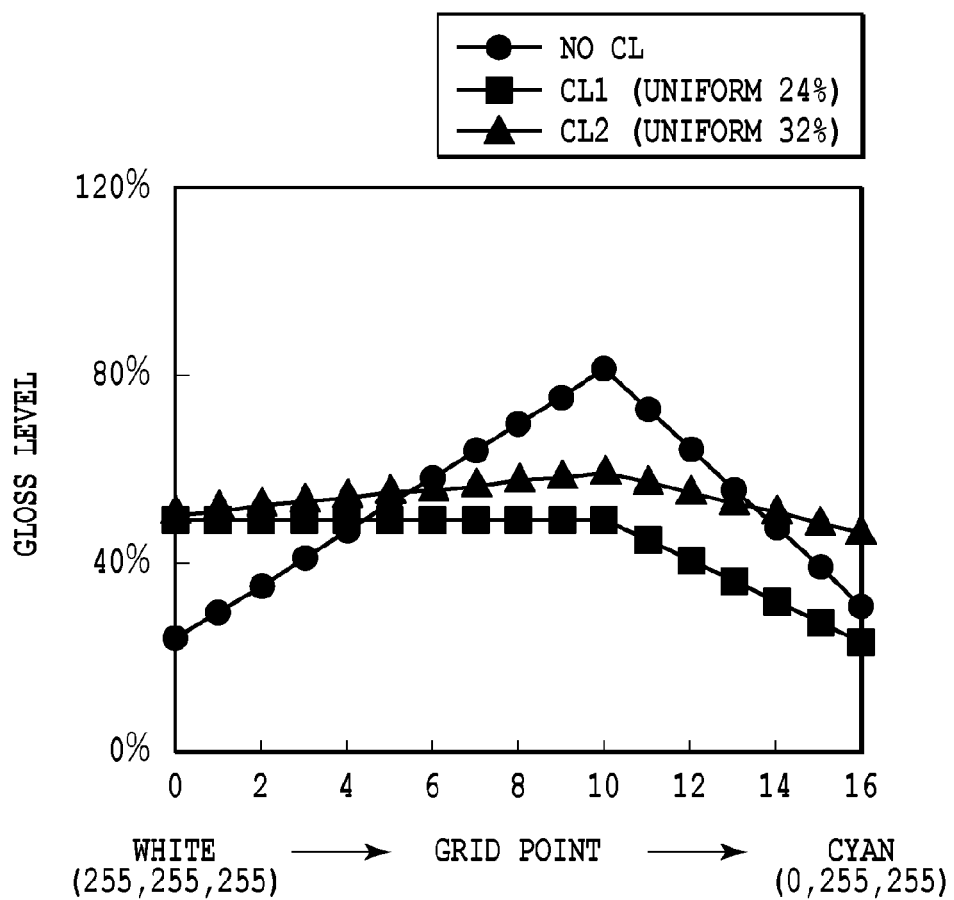
FIG. 14 is a diagram illustrating the gloss when changing the CL ink application method with respect to the white-to-cyan ink color separation illustrated in FIG. 13.

FIG. 14 is a diagram illustrating the glossiness when changing the CL ink application method with respect to the white-to-cyan ink color separation illustrated in FIG. 13. In FIG. 14, the horizontal axis represents the number of a grid point corresponding to RGB values, while the vertical axis represents the glossiness.

The "no CL" graph in FIG. 14 expresses the glossiness in the case of printing on the basis of only the dark cyan and light cyan data obtained by the color separation illustrated in FIG. 13, or in other words, in the case of not using clear ink. In this case, the glossiness increases together with increases in light ink up to grid point 10, and monotonically decreases from grid point 10 to the primary cyan at grid point 16. In other words, uneven glossiness occurs on a white-to-cyan line in the case of not applying clear ink. It is inferred that this is because in the case of not applying clear ink, the height and surface roughness of the color material layer fixed to the sheet surface layer vary due to the ink color as in the example of no CL in FIG. 2A. In addition, light cyan ink tends to be less viscous compared to dark ink, and it is inferred that adjustment polymers added to compensate for the viscosity have a surface-smoothing effect.

The "CL1" graph in FIG. 14 expresses the glossiness in the case of additionally printing clear ink CL1 applied by common printing at a uniform amount of 24% in addition to the dark cyan and light cyan obtained by the color separation illustrated in FIG. 13. In this case, the glossiness of white at grid point 0 is increased compared to the case of not applying clear ink, and in addition, the glossiness is suppressed at grid point 10 where the light ink amount reaches a maximum. On the other hand, the glossiness is reduced below the case of not applying clear ink for the primary cyan at grid point 16. In other words, uneven glossiness cannot be sufficiently suppressed even by applying clear ink CL1.

The "CL2" graph in FIG. 14 expresses the glossiness in the case of applying clear ink CL2 by after application printing at a uniform amount of 32% in addition to the dark cyan and light cyan obtained by the color separation illustrated in FIG. 13. In this case, the glossiness of white at grid point 0 is increased compared to the case of not applying clear ink, and in addition, the increase in glossiness accompanying the increase in light ink is also suppressed. Moreover, the glossiness of the primary cyan at grid point 16 is also increased compared to the case of not applying CL. However, there is less glossiness compared to the glossiness at grid point 10, and uneven glossiness is not being sufficiently suppressed even by applying clear ink CL2.

Figure 15:
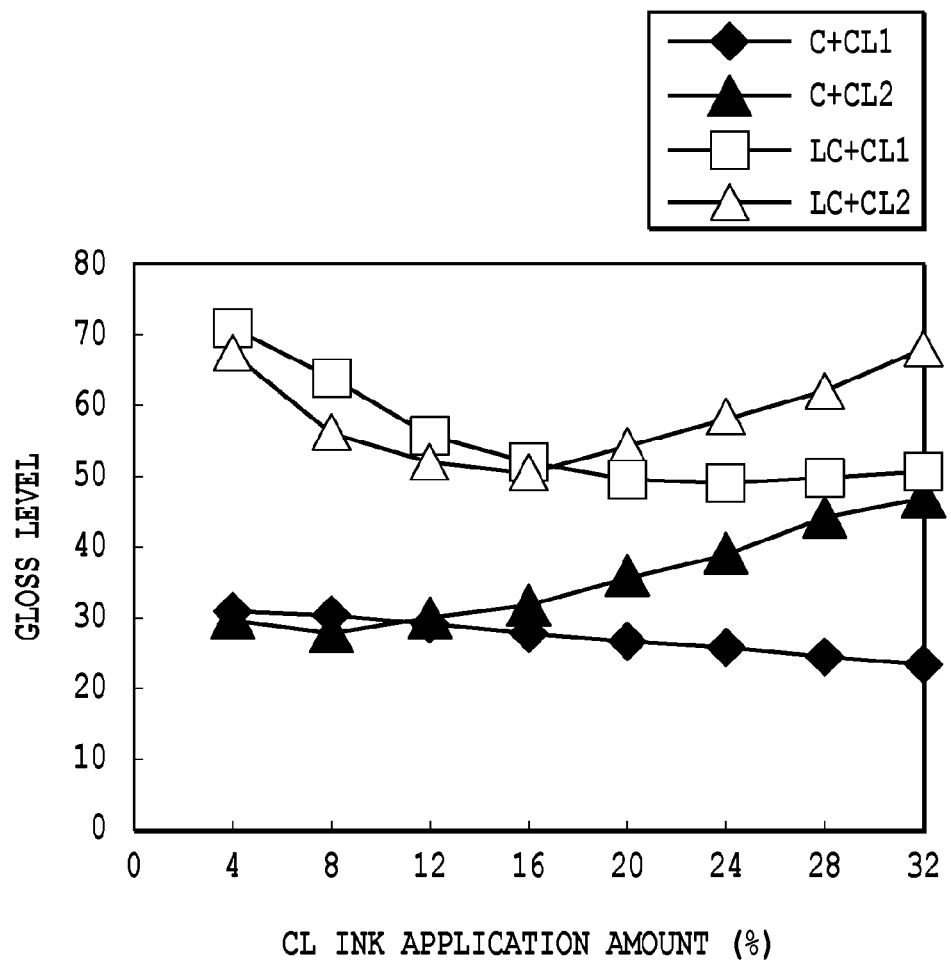
FIG. 15 is a diagram illustrating the change in the gloss when varying the application amounts for clear ink CL1 applied by common printing and clear ink CL2 applied by after application printing, with respect to 100% C ink and 80% LC ink.

FIG. 15 is a diagram illustrating the change in the glossiness when varying the application amounts of clear ink CL1 applied by the common printing and clear ink CL2 applied by the after application printing, with respect to 100% amount of C ink and 80% amount of LC ink. Herein, the "C+CL1" and "C+CL2" graphs illustrate the changes in the glossiness in the case of varying the respective application amounts of the clear ink CL1 and CL2 with respect to the ink mount (100%) of C ink at primary cyan (grid point 16) in the color separation illustrated in FIG. 13. Similarly, the "LC+CL1" and "LC+CL2" graphs illustrate the changes in the glossiness when varying the respective application amounts of the clear ink CL1 and CL2 with respect to the ink amount (80%) of LC ink at an intermediate point (grid point 8) in the color separation illustrated in FIG. 13.

As illustrated in FIG. 15, LC ink has relatively higher specular glossiness compared to C ink. Also, when applying clear ink in the case of C ink, applying clear ink CL1 by the common printing enables suppression of glossiness. On the other hand, glossiness can be increased by applying clear ink CL2 by the after application printing.

Figure 16A:
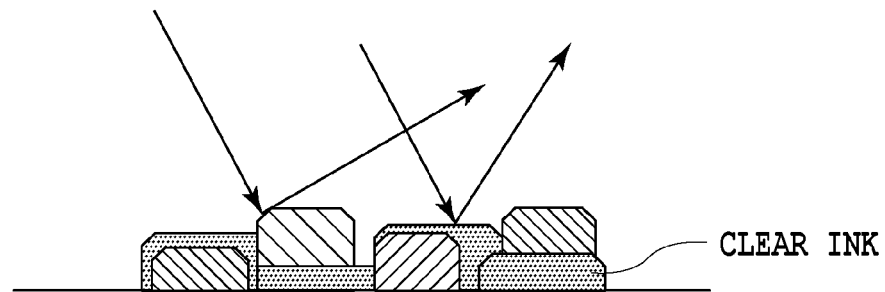
FIGS. 16A and 16B are schematic diagrams illustrating the states of image formation on a sheet surface, and the scattering of light at that surface, when respectively applying clear ink CL1 and CL2 by common printing and after application printing.

FIG. 16A is a schematic diagram illustrating the state of image formation on a sheet surface, and the scattering of light at that surface, when applying clear ink CL1 by the common printing. For example, in the case of the common printing that applies clear ink and colored ink during the same scan of the print head, dots where the clear ink is on the bottom and the colored ink is on top occur, and dots where the colored ink is on the bottom and the clear ink is on top also occur. As a result, there is significant surface irregularity compared to the case of not applying the clear ink. This irregularity is able to scatter light at the sheet surface layer, and suppress glossiness.

Figure 16B:
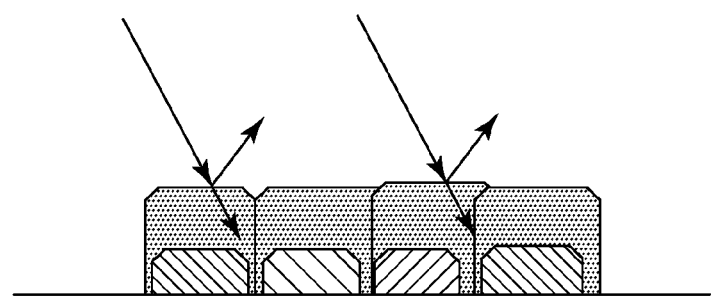

On the other hand, FIG. 16B is a schematic diagram illustrating the state of image formation on a sheet surface, and the scattering of light at that surface, when applying clear ink CL2 by the after application printing. In the case of the after application printing, the clear ink is applied on top of the colored ink, thus making the surface of the color material layer smoother compared to the case of not applying clear ink. Thus, it is possible to suppress light scattering at the sheet surface layer, and increase glossiness.

Referring back to FIG. 15, in the case of light cyan ink LC, applying clear ink CL1 by the common printing can suppress glossiness in accordance with increases in the application amount, with the glossiness not decreasing further past an application amount of 24%. Also, applying clear ink CL2 by the after application printing first decreases glossiness in accordance with increases in the application amount, with the glossiness increasing again at a boundary of 15%.

The mechanism by which the glossiness decreases in the case of low application amounts of clear ink CL2 is inferred to be as follows. Areas where the light cyan ink LC is being used are low-density areas. The coverage ratio of ink dots covering the sheet surface is not high, and many white portions of the sheet remain. It is thought that if clear ink is then ejected onto the white sheet sparsely, the surface of the white sheet will be roughened and become less smooth, decreasing glossiness. Meanwhile, the increase in glossiness past a clear ink application amount of approximately 15% is thought to occur because ejecting at least a certain degree of clear ink sufficiently increases the amount of clear ink lying over the colored ink, increasing surface smoothness.

Furthermore, comparing the effects of the clear ink CL1 and the clear ink CL2 in FIG. 15 demonstrates that lower glossiness can be realized in the case of applying clear ink CL1.

Next, glossiness homogenization by glossiness control according to an embodiment of the present invention and based on the changes in glossiness due to the clear ink CL1 and CL2 as described above with reference to FIGS. 14 to 16 will be described.

Figure 17:
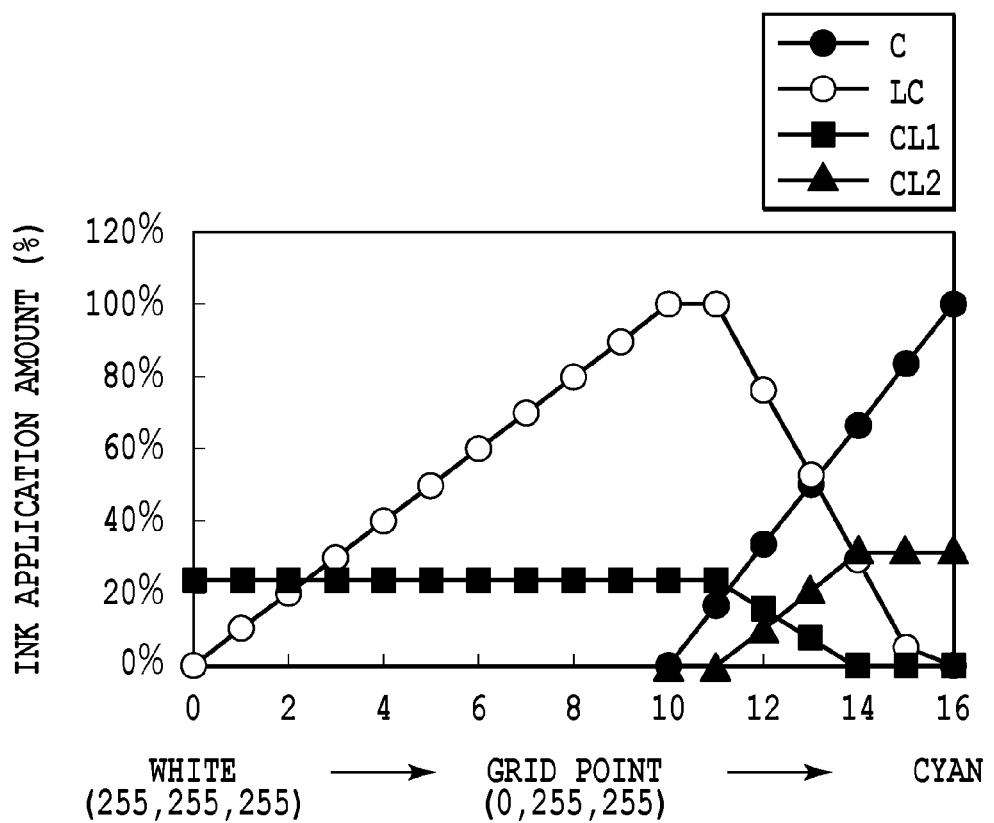
FIG. 17 is a diagram illustrating a color separation table used by the color processing section 902 (FIG. 4) according to an embodiment of the present invention.

FIG. 17 is a diagram illustrating a color separation table used by the color processing section 902 (FIG. 4) according to an embodiment of the present invention, and illustrates application amounts for the ink C and LC as well as the clear ink CL1 and CL2 with respect to grid points on a white-to-cyan line.

As illustrated in FIG. 17, with the color separation of the present embodiment, light cyan ink LC has an application amount of 80% at grid point 8 of the highlight portion in the white to cyan line, while dark cyan ink C has an application amount of 100% at the primary cyan grid point 16. According to FIG. 15, which illustrates test results under these application amount conditions, a glossiness of 50 or higher is maintained in areas where light cyan ink LC is used, as discussed earlier with FIG. 15.

This fact will be used to raise the glossiness in areas where dark cyan ink C is used. More specifically, the clear ink CL2 by the after application printing starts to be used starting around grid point 11, with the rate gradually increasing to reach a clear ink CL2 application amount of 32% at primary cyan (grid point 16). This allows the glossiness to be equalized with the areas where light cyan ink LC is used.

Also, the application amount of the clear ink CL1 by the common printing is set to an approximately constant 32% in the highlight portion including grid point 8, thereby equalizing the glossiness with the maximum gloss reached using dark cyan ink C. In addition, the application amount of the clear ink CL1 starts to decrease near grid point 11 where the above clear ink CL2 starts being used, and becomes zero at grid point 14.

With the color separation for each ink, including the clear ink, illustrated in FIG. 17 as described above, the clear ink is used by at least using the clear ink CL1 by the common printing in areas where the application amount of light cyan ink is greater than that of dark cyan ink (areas where light cyan ink is mainly used). Meanwhile, clear ink is used by at least using the clear ink CL2 by the after application printing in areas where the application amount of dark cyan ink is greater than that of light cyan ink (areas where dark cyan ink is mainly used).

Figure 18:
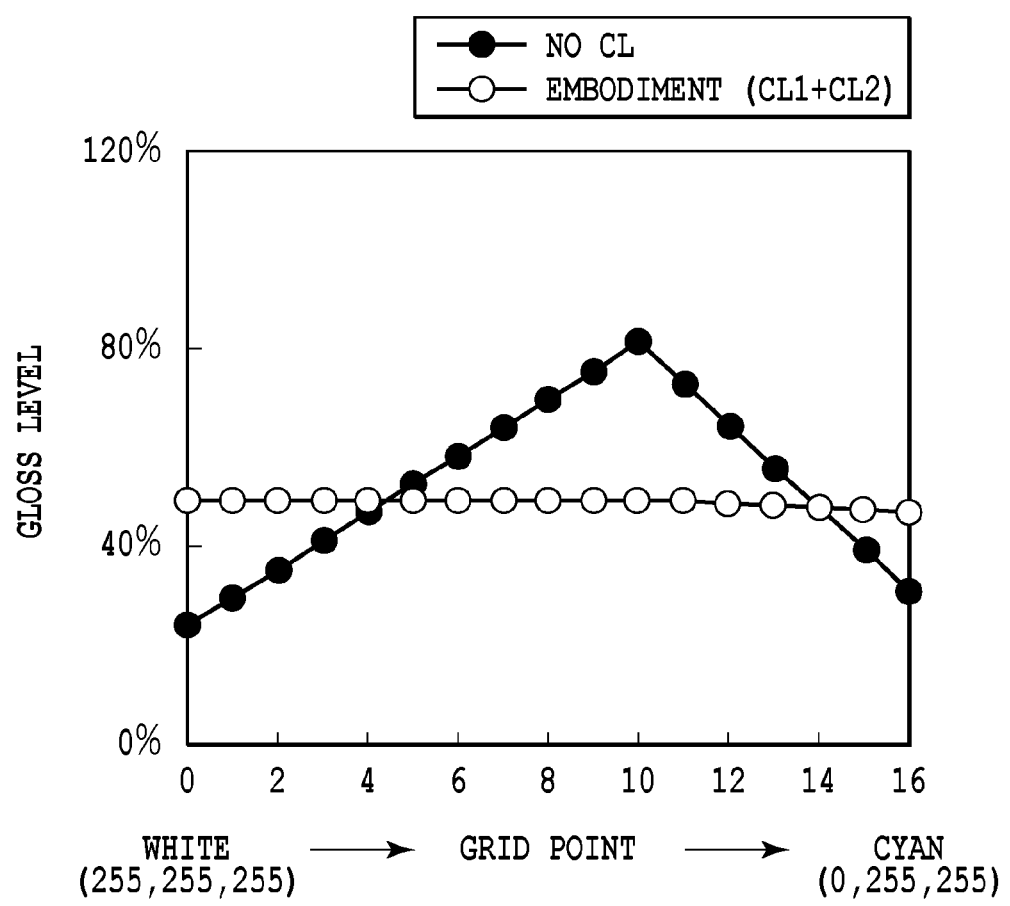
FIG. 18 is a diagram illustrating gloss measurement results for a printing unit that prints on the basis of the color separation according to the present embodiment.

FIG. 18 is a diagram illustrating glossiness measurement results for a printing unit that prints on the basis of the color separation according to the present embodiment described above. The "CL1+CL2" graph illustrates the glossiness in the present embodiment. Comparison with the "no CL" graph also illustrated in FIG. 18 demonstrates that the glossiness is kept nearly constant over the entire range from white to cyan. In other words, it is possible to suppress uneven glossiness.

Note that although the foregoing describes light cyan as an example of light ink and cyan as an example of dark ink, the present invention is still applicable insofar as a dark and light relationship is established. For example, the present invention is also applicable to relationships such as dark and light magenta, gray and black, and light gray and gray.

<Modification 1>

The foregoing embodiment relates to an example of applying clear ink (CL1) to a white point. However, with an inkjet printer in which a print head serially scans and prints, the white of the sheet is ordinarily used when the image data is white, and ink is not ejected to form a dot at such portions. Consequently, images with large amounts of white can be printed quickly.

Figure 19:
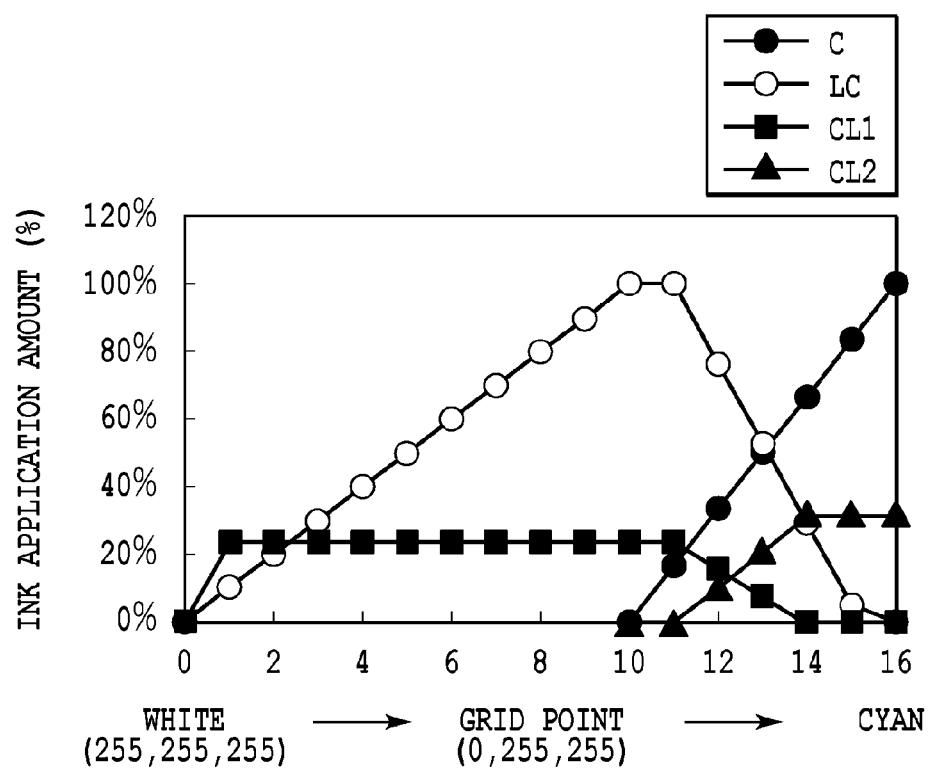
FIG. 19 is a diagram illustrating a color separation table for a white-to-cyan line according to a modification of an embodiment of the present invention.

Thus, from the perspective of printing speed, a configuration that does not apply clear ink to white points is possible. In this case, the color separation illustrated in FIG. 19 is used. In other words, the application amount of CL ink at the white point is taken to be 0, as illustrated in FIG. 19.

According to the above embodiment, it is possible to conduct printing able to realize both high-speed printing and suppression of uneven glossiness.

<Modification 2>

The foregoing embodiment relates to an example of smoothly switching between clear ink CL1 and clear ink CL2 when applying clear ink. However, smoothly switching in this way is not always required, and clear ink may be switched appropriately as necessary.

<Modification 3>

In some cases, the glossiness in areas where both light cyan ink LC and dark cyan ink C are applied is more greatly affected by the dark cyan ink C. This occurs in cases such as where the dark cyan ink C is applied to the sheet surface after the light cyan ink LC, and the color material layer of the light cyan ink LC becomes covered by the color material layer of the dark cyan ink C, for example. In such cases, since the gloss is more greatly affected by the dark cyan ink C, applying clear ink CL2 by after application printing becomes effective in areas where dark cyan ink C is used.

Figure 20A:
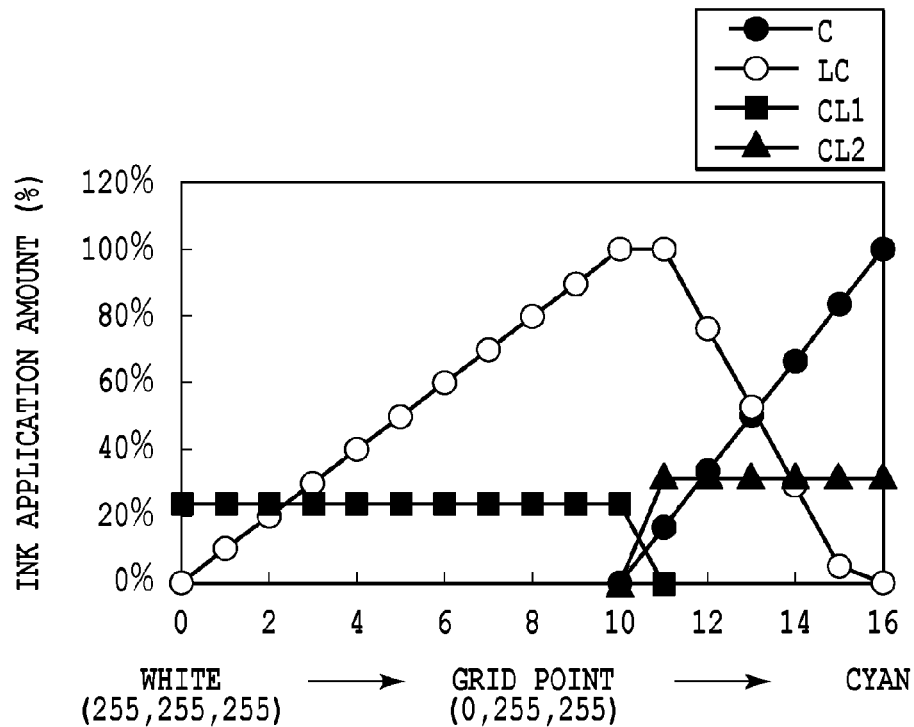
FIGS. 20A and 20B are diagrams illustrating color separation tables for a white-to-cyan line according to other respective modifications of an embodiment of the present invention.

FIG. 20A is a diagram illustrating color separation for the above case. As illustrated in FIG. 20A, clear ink CL1 is applied by the common printing while only light cyan ink LC is used, up to grid point 10. Meanwhile, clear ink CL2 is applied by after application printing when dark cyan ink C is used, starting from grid point 11. In so doing, it is possible to suppress uneven glossiness even in cases where the effects of dark ink become stronger in areas where both dark and light inks are printed.

<Modification 4>

In some cases, the gloss in areas where both light cyan ink LC and dark cyan ink C are printed is more greatly affected by the light cyan ink LC. This occurs in cases such as where the light cyan ink LC is applied to the sheet surface after the dark cyan ink C, and the color material layer of the dark cyan ink C becomes covered by the color material layer of the light cyan ink LC, for example.

In such cases, since the gloss is more greatly affected by the light cyan ink LC, applying clear ink CL1 by common printing becomes effective in areas where light cyan ink LC is used.

Figure 20B:
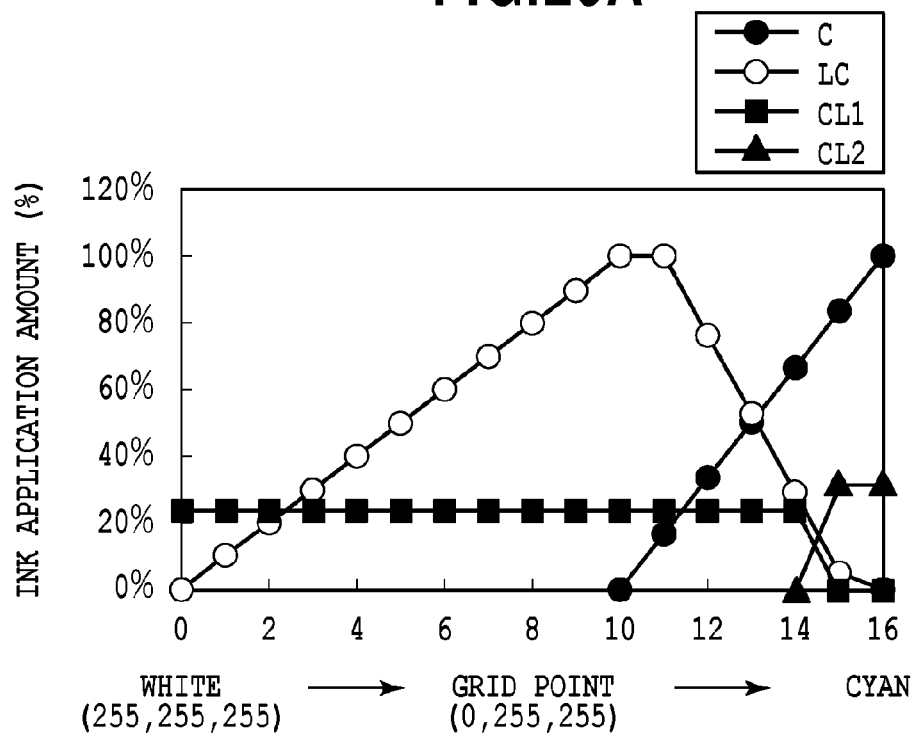

FIG. 20B is a diagram illustrating color separation for the above case. As illustrated in FIG. 20B, clear ink CL2 is applied by the after application printing while nearly only dark ink cyan C is being used, at grid points 15 to 16. Meanwhile, clear ink CL1 is applied by the common printing when light cyan ink LC is used, from grid point 0 to 14. In so doing, it becomes possible to suppress uneven glossiness even in cases where the effects of light ink become stronger in areas where both dark and light inks are printed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-106990, filed May 8, 2012 which is hereby incorporated by reference herein in its entirety.

What is claimed is:

1. An image processing apparatus for forming an image on a unit area of a print medium by performing printing by applying a colored first ink, a colored second ink with a lower color material concentration than that of the first ink and having the same hue as that of the first ink, and clear ink to the print medium with use of a print head, said apparatus comprising:

a determining unit configured to determine application amounts for each of the first and second inks, a first application amount of the clear ink which is an application amount of the clear ink for the printing operation that starts applying the clear ink to the unit area before completing applying the colored ink to the unit area, and a second application amount of the clear ink which is an application amount of the clear ink for the printing operation that starts applying the clear ink to the unit area after completing applying the colored ink to the unit area, based on image data of the image; and a controlling unit configured to cause the print head to eject the first ink, the second ink, and the clear ink to the print medium according to the application amounts for the first ink, the second ink and the clear ink determined by said determining unit, wherein said determining unit determines the application amounts for the first ink, the second ink and the clear ink such that in at least a part of cases that satisfy a condition that the application amount for the second ink is greater than the application amount for the first ink, the first application amount is greater than the second application amount, and in at least a part of cases that satisfy a condition that the application amount for the first ink is greater than the application amount for the second ink, the second application amount is greater than the first application amount.

2. The image processing apparatus according to claim 1, wherein the application of the clear ink according to the first application amount and the second application amount is performed by different nozzle groups of the print head that eject the clear ink.

3. The image processing apparatus according to claim 1, wherein the application of the clear ink is performed by the same nozzle line of the print head that ejects the clear ink, with the clear ink according to the first application amount being applied by a lower nozzle group, and the clear ink according to the second application amount being applied by an upper nozzle group.

4. The image processing apparatus according to claim 1, wherein said determining unit determines the application amount for the clear ink to be zero in the case where the image data expresses white.

5. The image processing apparatus according to claim 1, wherein said determining unit determines the second application amount to be greater than zero when the application amount of the first ink is greater than zero.

6. The image processing apparatus according to claim 1, wherein said determining unit determines the first application amount to be greater than zero when the application amount of the second ink is greater than zero.

7. The image processing apparatus according to claim 1, wherein said determining unit determines the application amounts for the first ink, the second ink and the clear ink such that in at least a part of cases that satisfy a condition that the application amount for the second ink is greater than the application amount for the first ink, the second application amount is determined to be zero.

8. The image processing apparatus according to claim 1, wherein said determining unit determines the application amounts for the first ink, the second ink and the clear ink such that in at least a part of cases that satisfy a condition that the application amount for the first ink is greater than the application amount for the second ink, the first application amount is determined to be zero.

9. An image processing method of forming an image on a unit area of a print medium by performing printing by applying a colored first ink, a colored second ink with a lower color material concentration than that of the first ink and having the same hue as that of the first ink, and clear ink to the print medium with use of a print head, said method comprising:
   a determining step of determining application amounts for each of the first and second inks, a first application amount of the clear ink which is an application amount of the clear ink for the printing operation that starts applying the clear ink to the unit area before completing applying the colored ink to the unit area, and a second application amount of the clear ink which is an application amount of the clear ink for the printing operation that starts applying the clear ink to the unit area after completing applying the colored ink to the unit area, based on the image data of the image; and
   a controlling step of causing the print head to eject the first ink, the second ink, and the clear ink to the print medium according to the application amounts for the first ink, the second ink and the clear ink determined by said determining step,
   wherein said determining step determines the application amounts for the first ink, the second ink and the clear ink such that in at least a part of cases that satisfy a condition that the application amount for the second ink is greater than the application amount for the first ink, the first application amount is greater than the second application amount, and in at least a part of cases that satisfy a condition that the application amount for the first ink is greater than the application amount for the second ink, the second application amount is greater than the first application amount.

10. The image processing method according to claim 9, wherein the application of the clear ink according to the first application amount and the second application amount is performed by different nozzle groups of the print head that eject the clear ink.

11. The image processing method according to claim 9, wherein the application of the clear ink is performed by the same nozzle line of the print head that ejects the clear ink, with the clear ink according to the first application amount being applied by a lower nozzle group, and the clear ink according to the second application amount being applied by an upper nozzle group.

12. The image processing method according to claim 9, wherein said determining step determines the application amount for the clear ink to be zero in the case where the image data expresses white.

13. The image processing method according to claim 9, wherein said determining step determines the second application amount to be greater than zero when the application amount of the first ink is greater than zero.

14. The image processing method according to claim 9, wherein said determining step determines the first application amount to be greater than zero when the application amount of the second ink is greater than zero.

15. The image processing method according to claim 9, wherein said determining step determines the application amounts for the first ink, the second ink and the clear ink such that in at least a part of cases that satisfy a condition that the application amount for the second ink is greater than the application amount for the first ink, the second application amount is determined to be zero.

16. The image processing method according to claim 9, wherein said determining step determines the application amounts for the first ink, the second ink and the clear ink such that in at least a part of cases that satisfy a condition that the application amount for the first ink is greater than the application amount for the second ink, the first application amount is determined to be zero.

17. An inkjet printing apparatus that performs printing based on print data using a print head which respectively ejects colored ink and clear ink, comprising:
   a multi-pass print controlling unit configured to control printing so as to complete the printing of a unit area by (m+n) scans over the unit area with the print head,
   wherein said multi-pass print controlling unit controls to perform printing onto the unit area by ejecting the colored ink and the clear ink from the print head in each of m scans, and subsequently perform printing onto the unit area by ejecting the clear ink from the print head in each of n scans, and
   an image of a color near white is printed by ejecting the colored ink and the clear ink from the print head in each of the m scans, while a cyan image is printed by ejecting the colored ink from the print head in each of the m scans and by ejecting the clear ink from the print head in each of the n scans.

* * * * *